(12) United States Patent
Hojo et al.

(10) Patent No.: US 8,338,028 B2
(45) Date of Patent: Dec. 25, 2012

(54) ELECTRODE ACTIVE MATERIAL FOR POWER STORAGE DEVICE, POWER STORAGE DEVICE, AND ELECTRONIC AND TRANSPORT DEVICES

(75) Inventors: Nobuhiko Hojo, Osaka (JP); Yu Ohtsuka, Osaka (JP); Junichi Yoshida, Osaka (JP); Toshiki Nokami, Kyoto (JP)

(73) Assignee: Panasonic Corporation, Osaka (JP)

( * ) Notice: Subject to any disclaimer, the term of this patent is extended or adjusted under 35 U.S.C. 154(b) by 305 days.

(21) Appl. No.: 12/677,038

(22) PCT Filed: Feb. 16, 2009

(86) PCT No.: PCT/JP2009/000611
§ 371 (c)(1),
(2), (4) Date: Mar. 8, 2010

(87) PCT Pub. No.: WO2009/118990
PCT Pub. Date: Oct. 1, 2009

(65) Prior Publication Data
US 2010/0196758 A1 Aug. 5, 2010

(30) Foreign Application Priority Data
Mar. 28, 2008 (JP) ................. 2008-087868

(51) Int. Cl.
*H01M 10/26* (2006.01)
*H01M 4/60* (2006.01)
*H01M 6/04* (2006.01)
*C07C 49/607* (2006.01)
*C07C 49/707* (2006.01)

(52) U.S. Cl. ............ 429/213; 429/207; 429/231.95

(58) Field of Classification Search .......... 429/304, 429/321, 207, 213, 231, 231.95; 252/500; 568/357, 326, 327, 375; 562/549, 409
See application file for complete search history.

(56) References Cited

U.S. PATENT DOCUMENTS
4,343,871 A  8/1982  Tobishima et al.
(Continued)

FOREIGN PATENT DOCUMENTS
EP  0 911 893 A1  4/1999
(Continued)

OTHER PUBLICATIONS

"New lithium salts with croconato-complexes of boron for lithium battery electrolytes", Xue et al., Journal of Power Sources, 171 (2007), p. 944-947.*

(Continued)

*Primary Examiner* — Jonathan Crepeau
*Assistant Examiner* — Kenneth Douyette
(74) *Attorney, Agent, or Firm* — McDermott Will & Emery LLP

(57) ABSTRACT

An electrode active material for a power storage device of the invention includes a ketone compound that includes a ring structure in a molecule, the ring structure being a five-membered or seven-membered ring composed of atoms at least three adjacent ones of which are each bonded to a ketone group. The electrode active material for a power storage device of the invention has a high weight-energy density and good reversibility of oxidation-reduction reaction. The use of the electrode active material for a power storage device of the invention can provide a power storage device having a high capacity, a high voltage, and good charge/discharge cycle characteristics.

9 Claims, 9 Drawing Sheets

U.S. PATENT DOCUMENTS

| | | | |
|---|---|---|---|
| 5,382,481 A * | 1/1995 | Fleischer | 429/304 |
| 6,413,675 B1 | 7/2002 | Harada et al. | |
| 6,642,419 B1 * | 11/2003 | Miura et al. | 568/357 |
| 6,743,877 B1 | 6/2004 | Armand et al. | |
| 2001/0010877 A1 * | 8/2001 | Arai | 429/61 |
| 2003/0118877 A1 * | 6/2003 | Armand et al. | 429/12 |
| 2003/0193042 A1 * | 10/2003 | Go et al. | 252/500 |

FOREIGN PATENT DOCUMENTS

| | | |
|---|---|---|
| JP | 56-086466 | 7/1981 |
| JP | 4-87258 | 3/1992 |
| JP | 10-154512 | 6/1998 |
| JP | 11-126610 | 5/1999 |
| JP | 2000-040527 | 2/2000 |
| JP | 2001-512526 | 8/2001 |
| JP | 2008-222559 | 9/2008 |
| WO | WO 2008/108105 A1 | 9/2008 |

OTHER PUBLICATIONS

"Electrochemical investigation of superoxide anion scavenging ability of 1,2,3-triketohydrindene hydrate in aprotic solvents", Herath et al., Electrochimica Acta 51 (2006), p. 2890-2897.*

* cited by examiner

70

— Mechanical power transfer path
--- Electric power line
— Control line
= Hydraulic system

ELECTRODE ACTIVE MATERIAL FOR POWER STORAGE DEVICE, POWER STORAGE DEVICE, AND ELECTRONIC AND TRANSPORT DEVICES

RELATED APPLICATIONS

This application is the U.S. National Phase under 35 U.S.C. §371 of International Application No. PCT/JP2009/000611, filed on Feb. 16, 2009, which in turn claims the benefit of Japanese Application No. 2008-087868, filed on Mar. 28, 2008, the disclosures of which Applications are incorporated by reference herein.

TECHNICAL FIELD

The invention relates to an electrode active material for a power storage device, a power storage device, and electronic and transport devices. More particularly, the invention relates mainly to an improvement in an electrode active material for a power storage device.

BACKGROUND ART

With the recent advancement in electronic technology, portable electronic devices, such as cell phones, portable personal computers, personal data assistances (PDAs), and portable game machines, have rapidly become popular. There is accordingly an increased demand for power storage devices, such as secondary batteries that can be repeatedly charged and discharged, as the power source for portable electronic devices. Among them, lithium ion secondary batteries are widely used as the power source for portable electronic devices, since they have high electromotive force and high energy density and can be made more compact relatively easily.

In order to make portable electronic devices versatile, portable electronic devices are required to provide improved performance. For example, they are required to be more light-weight, more compact, and more multifunctional. Accordingly, batteries used as the power source for such portable electronic devices are required to provide higher energy density and the like. An effective approach to heightening the energy density of a battery is to use an electrode active material having a high energy density. Therefore, new materials having high energy densities are actively studied and developed for both positive and negative electrode active materials.

For example, the use of an organic compound capable of reversible oxidation-reduction reaction as an electrode active material is examined. An organic compound has a specific gravity of approximately 1 g/cm$^3$ and is more light-weight than an inorganic oxide such as lithium cobalt oxide, which has been commonly used as an electrode active material. Hence, the use of an organic compound as an electrode active material is thought to provide a power storage device with a high weight-energy density. Also, since no heavy metal is used as an electrode active material, it is possible to reduce risks such as depletion of rare metals, price fluctuations due to such depletion, and environmental pollution by leakage of heavy metals.

In one example of research and development on the use of an organic compound as an electrode active material, the use of a quinone organic compound as an electrode active material in combination with an aqueous solution type electrolyte has been proposed (e.g., see Patent Documents 1 to 3). Quinone organic compounds generally refer to compounds having an aromatic ring and two ketone moieties (C=O) bonded to the aromatic ring, and derivatives thereof.

Patent Document 1 proposes using an organic compound having two ketone moieties (C=O) at the para-positions of an aromatic ring (hereinafter referred to as "paraquinone compound") or an organic compound having two ketone moieties at the ortho-positions of an aromatic ring (hereinafter referred to as "orthoquinone compound") as an electrode active material for an aqueous solution type secondary battery. Patent Documents 2 and 3 propose using a polymer of a paraquinone compound as an electrode active material for an aqueous solution type secondary battery.

In the secondary batteries of Patent Documents 1 to 3, the charge and discharge reactions are effected by addition (C—OH) and elimination of a proton to and from the ketone moieties (C=O). These Patent Documents state that the use of a quinone organic compound as an electrode active material can provide a secondary battery having good reversibility, i.e., good charge/discharge cycle characteristics. However, these aqueous solution type secondary batteries usually have low battery voltages of approximately 1 to 2 V, thus being inferior to lithium ion secondary batteries having battery voltages of approximately 3 to 4 V. It is therefore difficult to obtain a power storage device whose energy density is as high as that of lithium ion secondary batteries.

The use of a quinone organic compound as an electrode active material is also examined for non-aqueous type power storage devices, which are expected to have higher energy densities than aqueous solution type secondary batteries. For example, the use of a quinone organic compound as an electrode active material for a power storage device using an electrolyte comprising an organic solvent and a lithium salt dissolved therein has been proposed (e.g., see Patent Documents 4 and 5). Patent Document 4 uses 9,10-phenanthrene quinone, which is an orthoquinone compound, as an electrode active material. Patent Document 5 uses a polymer of a paraquinone compound as an electrode active material.

Also, it has been proposed to use a quinone organic compound having quinone moieties at the ortho-positions or para-positions of an aromatic ring, such as a rhodizonic acid salt, a rufigallic acid salt, an oxidation compound thereof, ellagic acid, or an oxidation compound thereof, as an electrode active material for a lithium ion secondary battery (e.g., see Patent Document 6).

However, it is difficult to commercialize conventional non-aqueous type power storage devices using quinone organic compounds, since the reversibility is insufficient and the discharge voltage is low, compared with conventional power storage devices using inorganic oxides such as lithium cobalt oxide.

Patent Document 1: Japanese Laid-Open Patent Publication No. Hei 4-87258
Patent Document 2: Japanese Laid-Open Patent Publication No. Hei 11-126610
Patent Document 3: Japanese Laid-Open Patent Publication No. 2000-40527
Patent Document 4: Japanese Laid-Open Patent Publication No. Sho 56-86466
Patent Document 5: Japanese Laid-Open Patent Publication No. Hei 10-154512
Patent Document 6: Japanese Laid-Open Patent Publication No. 2001-512526

DISCLOSURE OF THE INVENTION

Problem to be Solved by the Invention

An object of the invention is to provide an electrode active material having a high weight-energy density and good reversibility of oxidation-reduction reaction, a power storage device including the electrode active material and having a high capacity, a high voltage, and good charge/discharge cycle characteristics, and electronic and transport devices including the power storage device.

Means for Solving the Problem

The invention relates to an electrode active material for a power storage device, including a ketone compound that includes a ring structure in a molecule, the ring structure being a five-membered or seven-membered ring composed of atoms at least three adjacent ones of which are each bonded to a ketone group.

The ketone compound preferably has a structure represented by the following general formula (1):

[Chemical Formula 1]

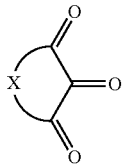

(1)

wherein X represents a divalent residue of a C2 or C4 saturated or unsaturated hydrocarbon, the divalent residue of a saturated or unsaturated hydrocarbon may have a fluorine atom, a cyano group, or a saturated or unsaturated hydrocarbon group as a substituent, the saturated or unsaturated hydrocarbon group may contain at least one atom selected from the group consisting of a fluorine atom, a nitrogen atom, an oxygen atom, a sulfur atom, and a silicon atom, and the divalent residue of a saturated or unsaturated hydrocarbon may have a substituent containing at least one atom selected from the group consisting of a nitrogen atom, an oxygen atom, a sulfur atom, and a silicon atom.

In the following description, the ketone compounds represented by the general formula (1) are referred to as triketone compounds (1).

Also, in another embodiment, the ketone compound preferably has a structure represented by the general formula (2):

[Chemical Formula 2]

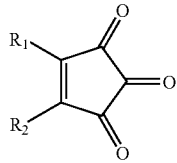

(2)

wherein $R_1$ and $R_2$ are each independently a hydrogen atom, a fluorine atom, or an unsaturated or saturated aliphatic group, the unsaturated or saturated aliphatic group may contain a halogen atom, a nitrogen atom, an oxygen atom, a sulfur atom, or a silicon atom, the unsaturated or saturated aliphatic group may be linear or cyclic, $R_1$ and $R_2$ may be bonded to each other to form a ring, the ring formed by the bonding of $R_1$ and $R_2$ may include a substituent selected from the group consisting of a fluorine atom, a cyano group, a C1 to C4 arkyl group, a C2 to C4 alkenyl group, a C3 to C6 cycloalkyl group, a C3 to C6 cycloalkenyl group, an aryl group, and an aralkyl group, and the substituent may contain at least one atom selected from the group consisting of a fluorine atom, a nitrogen atom, an oxygen atom, a sulfur atom, and a silicon atom.

In the following description, the ketone compounds represented by the general formula (2) are referred to as triketone compounds (2).

Also, among the ketone compounds (2), the triketone compounds having a structure represented by the following general formula (2A) are more preferable.

General formula (2A):

[Chemical Formula 3]

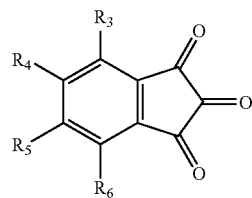

(2A)

wherein $R_3$ to $R_6$ are each independently a hydrogen atom, a fluorine atom, a cyano group, a C1 to C4 arkyl group, a C2 to C4 alkenyl group, a C2 to C4 alkynyl group, a C3 to C6 cycloalkyl group, a C3 to C6 cycloalkenyl group, an aryl group, or an aralkyl group, and the respective groups represented by $R_3$ to $R_6$ may contain at least one atom selected from the group consisting of a fluorine atom, a nitrogen atom, an oxygen atom, a sulfur atom, and a silicon atom.

In the following description, the ketone compounds represented by the general formula (2A) are referred to as triketone compounds (2A).

Further, in another embodiment, the ketone compound preferably has a structure represented by the general formula (3):

General formula (3):

[Chemical Formula 4]

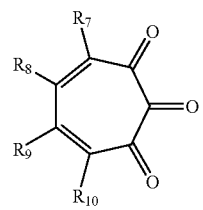

(3)

wherein $R_7$ to $R_{10}$ are each independently a hydrogen atom, a fluorine atom, a cyano group, a C1 to C4 arkyl group, a C2 to C4 alkenyl group, a C2 to C4 alkynyl group, a C3 to C6 cycloalkyl group, a C3 to C6 cycloalkenyl group, an aryl group, or an aralkyl group, and the respective groups represented by $R_7$ to $R_{10}$ may contain at least one atom selected from the group consisting of a fluorine atom, a nitrogen atom, an oxygen atom, a sulfur atom, and a silicon atom.

In the following description, the ketone compounds represented by the general formula (3) are referred to as triketone compounds (3A).

The ketone compound preferably has a plurality of structures represented by the general formula (1) in the molecule.

More preferably, the ketone compound has a plurality of structures represented by the general formula (1) in the molecule, and the plurality of structures represented by the general formula (1) are bonded via an aromatic ring.

Preferably, the aromatic ring derives from at least one aromatic compound selected from the group consisting of benzene, benzene derivatives, thiophene, naphthalene, naphthalene derivatives, anthracene, anthracene derivatives, pyridine, fluorene, and fluorene derivatives.

Preferably, the ketone compound is a lithium salt in reduced form.

The invention also relates to a power storage device including a positive electrode, a negative electrode, and an electrolyte, wherein at least one of the positive electrode and the negative electrode includes the electrode active material for a power storage device of the invention.

In the power storage device of the invention, preferably, the positive electrode includes the electrode active material for a power storage device of the invention as a positive electrode active material, the negative electrode includes a negative electrode active material capable of absorbing and desorbing lithium ions, and the electrolyte includes a salt comprising a lithium cation and an anion.

The invention also pertains to an electronic device including the power storage device of the invention.

The invention also relates to a transport device including the power storage device of the invention.

Effect of the Invention

The invention can provide an electrode active material for a power storage device having a large number of reactive electrons, a high energy density, and good reversibility of oxidation-reduction reaction. Also, the use of this electrode active material can provide a power storage device having a high capacity, a high voltage, and good charge/discharge cycle characteristics.

Also, since the electrode active material for a power storage device of the invention contains no heavy metal, it is possible to reduce the risk of price fluctuation of rare metals due to depletion thereof and environmental risks such as leakage of heavy metals.

BEST MODE FOR CARRYING OUT THE INVENTION

Figure 1:
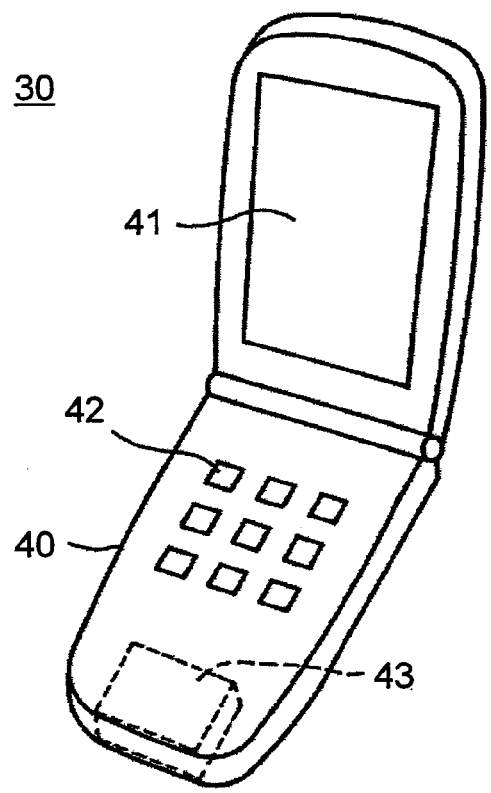
FIG. 1 is a schematic perspective view of the structure of a cell phone which is an embodiment of the invention.

In the process of research to solve the above-described problems, the inventors have focused their attention on quinone compounds, and conducted diligent research on the reaction mechanism thereof. As a result, they have found that there is a correlation between the molecular structure of a quinone compound and the power storage device characteristics. Based on this finding, they have found optimum materials for use as the electrode active materials for power storage devices.

First, the reaction mechanism when using a paraquinone compound is described based on the following reaction process formula (I). A paraquinone compound has ketone groups which contribute to oxidation-reduction reaction, and the ketone groups have a negative charge. The oxidation-reduction reaction between a paraquinone compound and a transfer carrier with a positive charge (hereinafter referred to as simply "transfer carrier") is a two-stage reaction represented by the following formulas (IA) and (IB), in which lithium ions are used as the transfer carrier.

[Reaction Process Formula (I)]

[Chemical Formula 5]

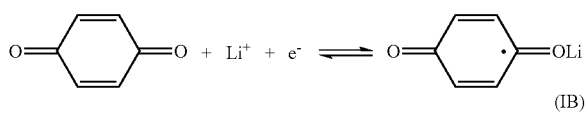

(IA)

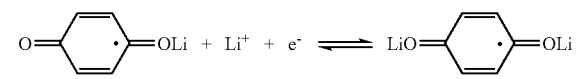

(IB)

In the two-stage reaction, the strength of the bond between the ketone group of the paraquinone compound and the lithium ion is determined by the difference between the charge density (negative charge) of the ketone group and the charge density (positive charge) of the lithium ion. That is, the greater the difference in charge density between the ketone group and the lithium ion, the more stable and strong the bond between the paraquinone compound and the lithium ion. The smaller the difference in charge density between the ketone group and the lithium ion, the weaker the bond between the paraquinone compound and the lithium ion, and the more likely the dissociation.

The paraquinone compound has two ketone groups which are apart from each other, and thus has a localized charge distribution and a large charge density. Also, the charge density of the paraquinone compound is significantly different from that of the lithium ion. Hence, in oxidation reaction, the ketone group and the lithium ion form a very strong bond similar to a covalent bond, thereby becoming stable in terms of energy. Thus, in reduction reaction, the lithium ion is unlikely to dissociate from the ketone group. Therefore, when a paraquinone compound is used as an electrode active material and lithium ions are used as the transfer carrier, the reaction reversibility tends to become low. As used herein, "stable" refers to a strongly bound state in which the dissociation of the lithium ion due to battery reaction is difficult, and does not refer to the stability of the compound in battery reaction.

Also, since the paraquinone compound has the two ketone groups which are apart from each other, the reactions represented by the above formulas (IA) and (IB) have independent energy levels. Specifically, the potential of the first stage (one-electron) reaction represented by the formula (IA) is as high as 2 to 3 V (relative to lithium), but the potential of the second stage (two-electron) reaction represented by the formula (IB) is as low as approximately 1.0 V (relative to lithium). Since the potential range actually used in non-aqueous type lithium ion secondary batteries is approximately 2 to 3 V (first stage only), the substantial capacity density is half.

Next, the reaction mechanism when using an orthoquinone compound is described based on the following reaction process formula (II). The oxidation-reduction reaction between an orthoquinone compound and lithium ions is a two-stage reaction represented by the following formulas (IIA) and (IIB).
[Reaction Process Formula (II)]

[Chemical Formula 6]

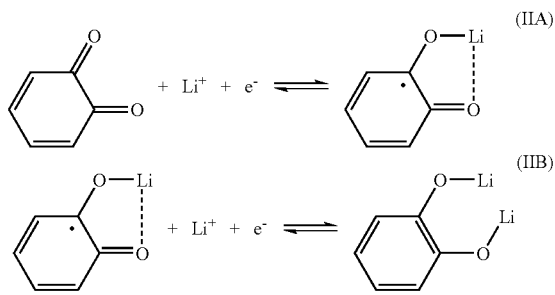

An orthoquinone compound has two ketone groups which are adjacent to each other, and the distribution of negative charge of the ketone groups is slightly delocalized, compared with a paraquinone compound. Thus, the bond formed between the ketone group and the lithium ion in oxidation reaction is weaker than the very strong bond of a paraquinone compound similar to a covalent bond. In the case of paraquinone in which the ketone groups (negative charge) are localized, one ketone group is necessarily bonded to one lithium ion on a one-to-one basis. On the other hand, in the case of an orthoquinone compound, in the first stage (one-electron) reaction represented by the formula (IIA), the two ketone moieties are bonded to one lithium ion, and in the second stage (two-electron) reaction represented by the formula (IIB), each of the two ketone moieties is bonded to one lithium ion.

That is, the bond between the ketone groups and the lithium ions is not a one-to-one bond between ketone groups with localized negative charge and lithium ions, but a two-to-two bond between two ketone groups with delocalized negative charge and two lithium ions. As a result, the bond between the ketone groups and the lithium ions becomes weak. In this way, in the case of an orthoquinone compound, the bond between the lithium ions and the ketone moieties becomes weak, compared with a paraquinone compound, and therefore, the reaction reversibility improves.

Since the orthoquinone compound has two ketone groups which are adjacent to each other, the reactions of the formulas (IIA) and (IIB) have relatively close energy levels. Specifically, the potential of the first stage (one-electron) reaction of the formula (IIA) and the potential of the second stage (two-electron) reaction of the formula (IIB) are close to each other and are approximately 2 to 3 V (relative to lithium).

Based on the above findings, the inventors have presumed that an organic compound that is capable of oxidation-reduction reaction, can be bonded to lithium ions, and has a delocalized negative charge distribution would provide a power storage device having good repeating characteristics even when using lithium ions as the transfer carrier. As a result of further research, they have found that a ketone compound whose molecule has a ring structure that is a five-membered or seven-membered ring bonded to three adjacent ketone groups (hereinafter referred to as a "triketone compound") has a large number of reactive electrons and good reaction reversibility.

The reaction mechanism when using a triketone compound is described based on the following reaction process formula (III). The oxidation-reduction reaction between a triketone compound and lithium ions is a two-stage reaction represented by the following formulas (IIIA) and (IIIB).
[Reaction Process Formula (III)]

[Chemical Formula 7]

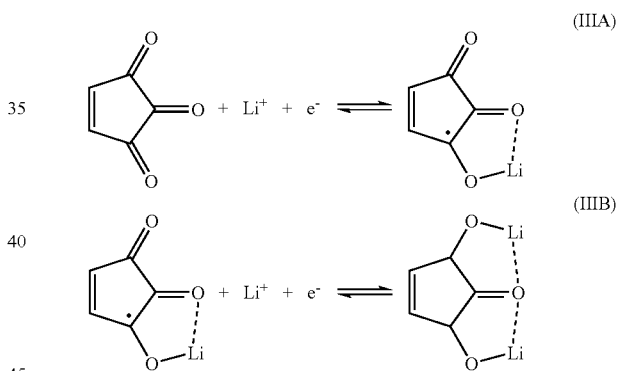

A triketone compound has three adjacent ketone groups, and the distribution of the negative charge of the ketone groups is more delocalized, compared with a paraquinone or orthoquinone compound. Thus, the bond formed between the ketone groups and lithium ions in oxidation reaction is weak, compared with a paraquinone or orthoquinone compound.

In the case of the triketone compound, in the first stage (one-electron) reaction represented by the formula (IIIA), two ketone moieties are bonded to one lithium ion. Likewise, in the second stage (two-electron) reaction represented by the formula (IIIB), two ketone moieties are bonded to one lithium ion. In the overall reaction, the three ketone moieties are bonded to the two lithium ions. In this way, since the bond between the ketone moieties and the lithium ions becomes significantly weak, even if lithium ions are used as the transfer carrier, a bond from which the lithium ions are dissociable is formed in reduction reaction, and therefore, the reaction reversibility improves.

Also, since the triketone compound has three ketone groups which are adjacent, the reactions of the formulas (IIIA) and (IIIB) have relatively close energy levels. Specifically, the potential of the first stage (one-electron) reaction and the potential of the second stage (two-electron) reaction are thought to be as high as 2 to 3 V (relative to lithium). Since the lithium ions are used as the transfer carrier, a power storage device having good output characteristics can be obtained. Specifically, a power storage device having a high output voltage of approximately 2.0 to 3.0 V can be obtained.

Also, in the case of a triketone compound, the three ketone groups serving as the reaction sites have very close energy levels. This means that in the two-electron reaction, the reaction potentials are close to each other, that the discharge voltage is stable, and that the average voltage hardly lowers. It is thus possible to obtain a power storage device having a high energy density and good controllability.

On the other hand, when a triketone compound has a chain molecular structure, the reaction between the triketone compound and a lithium ion is a reaction represented by the formula (IVA) of the following reaction process formula (IV).
[Reaction Process Formula (IV)]

[Chemical Formula 8]

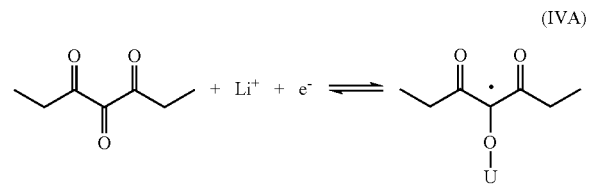

(IVA)

As shown by the formula (IVA), in the case of the chain molecular structure, the three ketone groups may not be adjacent for various reasons such as electrostatic repulsion and steric hindrance. That is, in the planar structure, the three oxygen atoms may not be adjacent on one side of the linear skeleton. In this case, for the same reason as that for a paraquinone compound, the ketone groups (negative charge) are localized, and the reaction reversibility becomes low. Also, the reaction potential becomes low.

In this respect, when a triketone compound is used as an electrode active material, it is advantageous for the triketone compound to have a cyclic molecular structure rather than a chain structure.

The ketone compound which is an electrode active material for a power storage device of the invention (hereinafter referred to as simply an "electrode active material") includes a ring structure in a molecule, the ring structure being a five-membered or seven-membered ring composed of atoms at least three adjacent ones of which are each bonded to a ketone group.

The ring structure included in the molecule and bonded to three adjacent ketone groups needs to be a five-membered or seven-membered ring in terms of the chemical stability of the ring structure in oxidation-reduction. When the ring structure is a six-membered ring bonded to three adjacent ketone groups, it cannot have aromaticity, and therefore, a chemically stable compound cannot be obtained.

The electrode active materials of the invention which are stable are limited to: ketone compounds that include a ring structure in a molecule, the ring structure being a five-membered ring composed of atoms three adjacent ones of which are each bonded to a ketone group; and ketone compounds that include a ring structure in a molecule, the ring structure being a seven-membered ring composed of atoms three or five adjacent ones of which are each bonded to a ketone group.

When the ring structure is a six-membered ring, it is chemically stable if four or six adjacent atoms forming the ring are each bonded to a ketone group. Representative examples of such organic compounds are rhodizonic acid or a rhodizonic acid salt described in Patent Document 6 cited as a conventional technique. However, in such organic compounds, the ketone groups (negative charge) are not localized in a molecule, unlike the ketone compounds which are the electrode active materials of the invention. Therefore, such organic compounds cannot serve as electrode active materials having good reversibility, a high voltage, and a high energy density.

When the ring structure in the molecule is a seven-membered ring and five ketone groups are adjacent in the ring, two ketone moieties with delocalized negative charge are bonded to one lithium ion, in the same manner as when three ketone groups are adjacent. Thus, the bond between the ketone moieties and the lithium ions becomes weak, and the ketone compound can reversibly react with the lithium ions for oxidation-reduction.

Also, the respective reactions of the plurality of ketone moieties occur at close potentials. For example, when five ketone groups are adjacent, the ketone compound is capable of reacting with up to 4 lithium ions for oxidation-reduction.

Also, when the ring structure is a five-membered ring or seven-membered ring, there are advantages of easy synthesis and good chemical stability. When the ring structure is a five-membered ring, such advantages become more evident.

The use of such a ketone compound can provide an electrode active material having a large number of reactive electrons, a high energy density, and good reversibility of oxidation-reduction reaction. Also, the use of such an electrode active material can provide a power storage device having a high capacity, a high voltage, and good charge/discharge repeating characteristics. Also, since the electrode active material contains no heavy metal, it is possible to reduce the risk of price fluctuation of rare metals due to depletion thereof and environmental risks such as leakage of heavy metals.

The ketone compound used as the electrode active materials of the invention has a high energy density, and is lightweight compared with inorganic oxides conventionally used as electrode active materials. It is thus possible to reduce the weight of the power storage device.

The ketone compound used as the electrode active material of the invention has, for example, a structure represented by the following general formula (1).

[Chemical Formula 9]

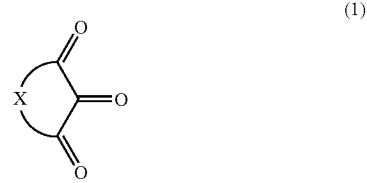

(1)

wherein X is as defined above.

In the formula (1), examples of divalent residues of a C2 or C4 saturated hydrocarbon represented by X include alkylene groups such as an ethylene group and a tetramethylene group. Also, examples of divalent residues of a C2 or C4 unsaturated hydrocarbon include alkenylene groups such as a vinylidene group and a butenylene group, and alkynylene groups such as an ethynylene group, a 2-butynylene group, a 1-butynylene group, and a 3-butynylene group.

In the formula (1), the divalent residue of a saturated or unsaturated hydrocarbon represented by X may have a substituent. Of such substituents, examples of saturated hydrocarbon groups include arkyl groups and cycloalkyl groups. Also, examples of unsaturated hydrocarbon groups include alkenyl groups, alkynyl groups, cycloalkenyl groups, aryl groups, and aralkyl groups.

Examples of arkyl groups include C1 to C4 linear or branched chain arkyl groups such as a methyl group, an ethyl group, a propyl group, an isopropyl group, a butyl group, an isobutyl group, and a tert-butyl group.

Examples of cycloalkyl groups include C3 to C6 cycloalkyl groups such as a cyclopropyl group, a cyclobutyl group, a cyclopentyl group, and a cyclohexyl group.

Examples of alkenyl groups include C2 to C4 linear or branched chain alkenyl groups having one to three double bonds such as vinyl, 1-propenyl, 1-methyl-1-propenyl, 2-methyl-1-propenyl, 2-propenyl, 2-butenyl, 1-butenyl, and 3-butenyl.

Examples of alkynyl groups include C2 to C4 linear or branched chain alkynyl groups such as an ethynyl group, a 1-propynyl group, a 2-propynyl group, a 1-methyl-2-propynyl group, a 1-butynyl group, a 2-butynyl group, and a 3-butynyl group.

Examples of cycloalkenyl groups include C3 to C6 cycloalkenyl groups such as a cyclopropenyl group, a cyclobutenyl group, a cyclopentenyl group, and a cyclohexenyl group.

Examples of aryl groups include C6 to C20 aryl groups such as a phenyl group, a naphthyl group, an anthryl group, and a phenanthryl group. Among these, for example, the phenyl group and the naphthyl group are preferable, and the phenyl group is more preferable.

Examples of aralkyl groups (arylalkyl group) include C7 to C9 aralalkyl groups whose alkyl moiety is a C1 to C3 linear or branched chain alkyl such as a benzyl group, a phenethyl group, a 1-phenylpropyl group, a 2-phenylpropyl group, a 3-phenylpropyl group, a 1-phenyl-1-methyl ethyl group, and a 1-methyl-2-phenylethyl group.

Of the substituents which the divalent residue of a saturated or unsaturated hydrocarbon represented by X may have, the saturated hydrocarbon group and the unsaturated hydrocarbon group may contain at least one atom selected from the group consisting of a fluorine atom, a nitrogen atom, an oxygen atom, a sulfur atom, and a silicon atom. Specifically, the saturated hydrocarbon group and the unsaturated hydrocarbon group may have a fluorine atom substituted therein. Also, the saturated hydrocarbon group and the unsaturated hydrocarbon group may have a substituent containing at least one atom selected from the group consisting of a nitrogen atom, an oxygen atom, a sulfur atom, and a silicon atom.

The divalent residue of a saturated or unsaturated hydrocarbon represented by X may have one or more substituents selected from the group consisting of a fluorine atom, a cyano group, a saturated hydrocarbon group, and an unsaturated hydrocarbon group. When the substituents of the divalent residue are saturated and/or unsaturated hydrocarbon groups and the number of the substituents is two, the two groups may be bonded to each other to form a ring.

Examples of nitrogen-atom containing substituents include a nitro group, an amino group, an amido group, an imino group, and a cyano group. Examples of oxygen-atom containing substituents include a hydroxyl group, an oxo group, and a carboxyl group. Examples of sulfur-atom containing substituents include an alkylthio group, a sulfo group, a sulfino group, a sulfeno group, and a mercapto group. An example of silicon-atom containing substituents is a silyl group.

Also, in the formula (1), the divalent saturated or unsaturated hydrocarbon residue represented by X may have another substituent in addition to a fluorine atom, a cyano group, a saturated hydrocarbon group, and an unsaturated hydrocarbon group. Examples of such substituents include substituents containing at least one atom selected from the group consisting of a nitrogen atom, an oxygen atom, a sulfur atom, and a silicon atom. More specifically, examples include those which are the same as the above-mentioned nitrogen-atom containing substituents, oxygen-atom containing substituents, sulfur-atom containing substituents, and silicon-atom containing substituents.

Both ends of the C2 or C4 saturated or unsaturated hydrocarbon are bonded to both ends of the three adjacent ketone groups to form a triketone compound (1) whose molecular structure is a five or seven-membered ring.

X needs to be a divalent residue of a C2 or C4 saturated or unsaturated hydrocarbon in order to provide a molecular structure of a five- or seven-membered ring. The triketone compounds (1) with such a molecular structure can be easily synthesized and are chemically stable.

That is, in terms of the ease of synthesis, the triketone compounds (1) having a molecular structure of a five- or seven-membered ring are preferable. Also, in terms of chemical stability, the triketone compounds (1) including a five- or seven-membered aromatic ring are preferable.

Also, in order to heighten the energy density per active material weight, it is desirable that the molecular weight of the portion other than the adjacent ketone moieties serving as the reaction sites be minimum. Therefore, as the saturated hydrocarbon group and unsaturated hydrocarbon group which the divalent residue of a saturated or unsaturated hydrocarbon represented by X may have as the substituents, it is preferable to use C1 to C4 arkyl groups, C2 to C4 alkenyl and alkynyl groups, and C3 to C6 cycloalkyl and cycloalkenyl groups.

Examples of the triketone compounds (1) with a five-membered ring structure include triketone compounds (2). Among the triketone compounds (2), triketone compounds (2A) are preferable. Also, examples of the triketone compounds (1) with a seven-membered ring structure include triketone compounds (3). The respective groups represented by $R_1$ to $R_2$, $R_3$ to $R_6$ and $R_7$ to $R_{10}$ in the general formula (2), general formula (2A), and general formula (3) have the same meanings as the respective groups cited as the saturated hydrocarbon group and unsaturated hydrocarbon group which the divalent residue of a saturated or unsaturated hydrocarbon represented by X in the general formula (1) may have as the substituents.

Among the triketone compounds (2), triketone compounds (2A), and triketone compounds (3), in terms of heightening the battery voltage, the respective groups represented by $R_1$ to $R_2$, $R_3$ to $R_6$, and $R_7$ to $R_{10}$ are preferably substituents with a high electron withdrawing property. More specifically, for example, aryl groups such as a phenyl group, a cyano group, a fluorine atom are preferable.

Among the triketone compounds (2A), triketone compounds represented by the following general formula are particularly preferable.

[Chemical Formula 10]

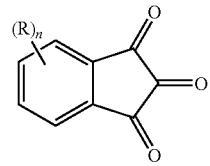

wherein n R each independently represent a hydrogen atom, a fluorine atom, a cyano group, a phenyl group, or a five-membered or six-membered heterocyclic compound residue containing sulfur as a hetero atom, and n represents an integer of 0 to 4.

In the above triketone compounds, among the groups represented by R, five-membered or six-membered heterocyclic compound residues containing sulfur as a hetero atom are further preferable. Also, n is more preferably 0 to 2.

Also, the ketone compound used as the electrode active material of the invention may be a compound having a plurality of structures represented by the general formula (1). Such ketone compounds are hereinafter referred to as polyketone compounds. Examples of polyketone compounds include multimers of triketone compounds represented by the general formula (1), polymers comprising a plurality of multimers bonded together, and aromatic-ring containing polyketone compounds comprising a plurality of structures represented by the general formula (1) that are bonded via an aromatic ring.

A multimer is a compound including two or more monomers derived from a triketone compound represented by the general formula (1), and is preferably a compound including 2 to 50 such monomers. Among the multimers, dimmers and trimers are particularly preferable. A polymer is a compound including a plurality of such multimers and having a molecular weight of 10000 or more, preferably a molecular weight of 10000 or more and 1000000 or less. In the case of such multimers or polymers, the number of reactive electrons increases.

Also, an aromatic-ring containing polyketone compound is a compound comprising a plurality of structures represented by the general formula (1) which are bonded to an aromatic ring. That is, the triketone compounds of the invention may have a plurality of portions (oxidation/reduction sites) with three adjacent ketone groups in the molecule. The aromatic ring is preferably derived from at least one aromatic compound selected from the group consisting of benzene, benzene derivatives, thiophene, naphthalene, naphthalene derivatives, anthracene, anthracene derivatives, pyridine, fluorene, and fluorene derivatives.

Among the aromatic-ring containing polyketone compounds, particularly preferred are aromatic-ring containing polyketone compounds represented by the general formula:

A-(B)$_m$ wherein A represents a phenylene group, a biphenylene group, a group:

[Chemical Formula 11]

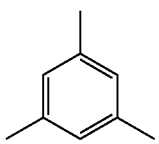

or a divalent residue of a five-membered or six-membered heterocyclic compound containing sulfur as a hetero atom, B represents a group:

[Chemical Formula 12]

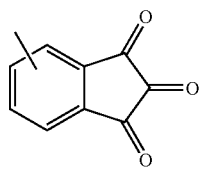

and m represents an integer of 2 or 3, but when m is 2, A is a divalent residue, and when m is 3, A is a trivalent residue.

Further, the ketone compound used as the electrode active material in the invention may be a lithium salt in reduced form.

Examples of the triketone compounds (2) are shown in the following Table 1.

TABLE 1

| Compound name | Chemical structural formula |
| --- | --- |
| Triketone compound (2a) | (2a) |
| Triketone compound (2b) | (2b) |
| Triketone compound (2c) | (2c) |

Examples of the triketone compounds (3) are shown in the following Table 2.

TABLE 2

| Compound name | Chemical structural formula |
| --- | --- |
| Triketone compound (3a) | (3a) |
| Triketone compound (3b) | (3b) |

Also, examples of the multimers are shown in the following Table 3.

TABLE 3

| Compound name | Chemical structural formula |
|---|---|
| Multimer (4a) | 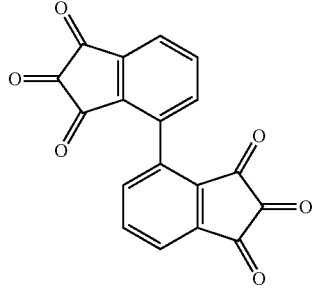 |
| Multimer (4b) | 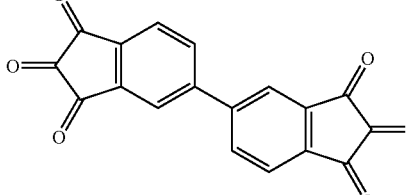 |

Also, examples of the aromatic-ring containing polyketone compounds are shown in the following Tables 4 and 5.

TABLE 4

| Compound name | Chemical structural formula |
|---|---|
| Aromatic-ring containing polyketone compound (5a) | 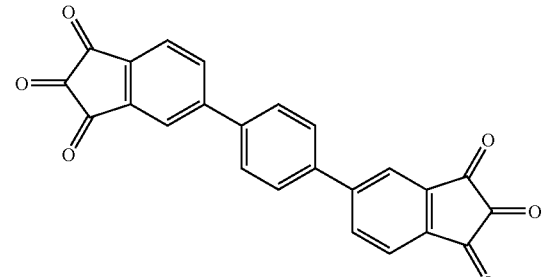 |
| Aromatic-ring containing polyketone compound (5b) | 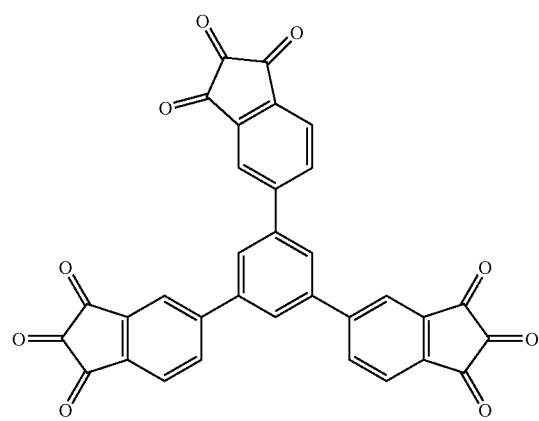 |
| Aromatic-ring containing polyketone compound (5c) | 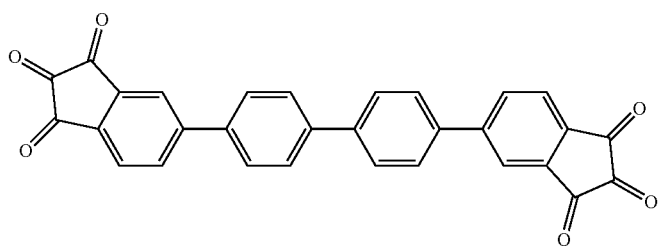 |

TABLE 4-continued

| Compound name | Chemical structural formula |
|---|---|
| Aromatic-ring containing polyketone compound (5d) | 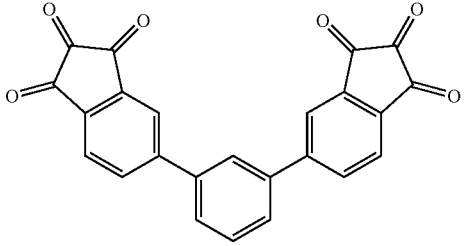 |

TABLE 5

| Compound name | Chemical structural formula |
|---|---|
| Aromatic-ring containing polyketone compound (5e) | 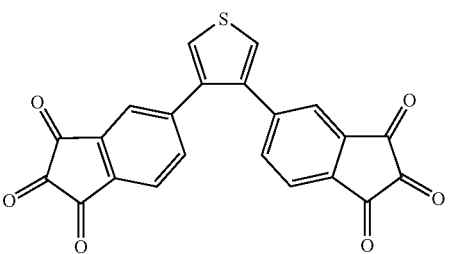 |

Also, other examples of the aromatic-ring containing polyketone compounds are shown in the following Table 6.

TABLE 6

| Compound name | Chemical structural formula |
|---|---|
| Aromatic-ring containing polyketone compound (5f) | 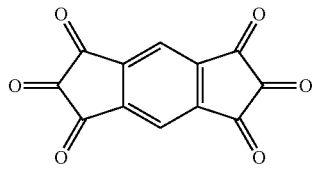 |
| Aromatic-ring containing polyketone compound (5g) | 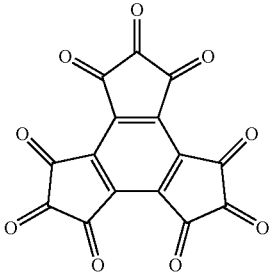 |
| Aromatic-ring containing polyketone compound (5h) | 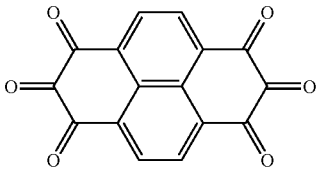 |

The following synthesis method is effective for bonding a plurality of base units represented by the general formula (1).

First, a protecting group is introduced into a quinone moiety (electrode reaction site) of a quinone compound. The quinone compound is a triquinone compound represented by the general formula (1). Examples of the protecting group include trimethylsilyl (TMS), triethylsilyl (TES), tert-butyldimethylsilyl (TBS or TBDMS), triisopropylsilyl (TIPS), tert-butyldiphenylsilyl (TBDPS), an arkyl group such as a methyl group, and a dimethyl acetal protecting group.

Next, boronic acid is introduced into a site to be bonded. Also, in a compound to be bonded to the quinone compound, a halogen such as iodine is introduced into a site to be bonded to the quinone compound.

The quinone compound having the protecting group and boronic acid group and the compound having the halogen group and serving as a linker site are coupled by using a palladium catalyst, and then subjected to a deprotection reaction (elimination reaction of the protecting group), to give a multimer, a polymer, or an aromatic-ring containing polyketone compound.

The power storage device of the invention includes, for example, a positive electrode, a negative electrode, a separator interposed between the positive electrode and the negative electrode, and an electrolyte. At least one of the positive electrode and the negative electrode includes such a triketone compound as described above as the electrode active material. That is, the electrode active material of the invention can be used in both positive and negative electrodes, and can be used in either one of the positive and negative electrodes. When the electrode active material of the invention is used in one of the positive and negative electrodes, an electrode active material conventionally used in power storage devices can be used in the other electrode.

The positive electrode comprises, for example, a positive electrode current collector and a positive electrode active material layer formed on the positive electrode current collector, and the positive electrode active material layer is positioned on the separator side.

The positive electrode current collector can be a commonly used one, and such examples include porous or non-porous sheets or films made of metal materials such as aluminum, stainless steel, and an aluminum alloy. Examples of such sheets or films include metal foil and mesh. Also, the surface of the positive electrode current collector may be coated with a carbonaceous material such as carbon, in order to reduce resistance values, provide a catalytic effect, and chemically or physically bonding the positive electrode active material layer to the positive electrode current collector to increase the adhesion of the positive electrode active material layer to the positive electrode current collector.

The positive electrode active material layer is formed on at least one surface of the positive electrode current collector. The positive electrode active material layer includes a positive electrode active material, and may contain, if necessary, an electron conductive agent, an ion conductive agent, a binder, and the like.

When a triketone compound is used as the positive electrode active material, for example, a material capable of absorbing and desorbing Li ions is used as the negative electrode active material. Examples of materials capable of absorbing and desorbing Li ions include carbon compounds such as carbon, graphitized carbon (graphite), and amorphous carbon, lithium compounds such as lithium metal, lithium-containing composite nitrides, and lithium-containing titanium oxides, Si compounds such as Si, Si oxides, and Si alloys, and Sn compounds such as Sn, Sn oxides, and Sn alloys. Also, an electrode using a triketone compound and a counter electrode containing activated carbon may be used to form a capacitor.

It is preferable to use a triketone compound as the positive electrode active material, a material capable of absorbing and desorbing Li ions as the negative electrode active material, and a non-aqueous electrolyte including a Li salt comprising a lithium cation and an anion as the electrolyte, in order to produce a power storage device.

An electron conductive agent and an ion conductive agent are used to reduce electrode resistance. The electron conductive agent can be one commonly used in this field. Examples include carbon materials such carbon black, graphite, and acetylene black, and conductive polymer compounds such as polyaniline, polypyrrole, and polythiophene. The ion conductive agent can be one commonly used in this field. Examples include gel electrolytes such as polymethyl methacrylate and polymethyl methacrylate, and solid electrolytes such as polyethylene oxide.

A binder is used, for example, to improve the adhesive properties of the materials constituting the electrode. The binder can be one commonly used in this field. Examples include polyvinylidene fluoride, vinylidene fluoride-hexafluoropropylene copolymer, vinylidene fluoride-tetrafluoroethylene copolymer, polytetrafluoroethylene, styrene-butadiene copolymer rubber, polypropylene, polyethylene, and polyimide.

The negative electrode comprises, for example, a negative electrode current collector and a negative electrode active material layer formed on the negative electrode current collector, and the negative electrode active material layer is positioned on the separator side. Examples of the negative electrode current collector include those used for the positive electrode current collector, and porous or non-porous sheets or films made of metal materials such as copper, nickel, a copper alloy, and a nickel alloy. For example, the surface of the negative electrode current collector may be coated with a carbonaceous material, in order to reduce resistance values, provide a catalytic effect, and increase the adhesion of the negative electrode active material layer to the negative electrode current collector.

The negative electrode active material layer is formed on at least one face of the negative electrode current collector. The negative electrode active material layer includes a negative electrode active material, and may contain, if necessary, an electron conductive agent, an ion conductive agent, a binder, and the like. When a triketone compound is used as the negative electrode active material, for example, lithium-containing metal oxides such as $LiCoO_2$, $LiNiO_2$, and $LiMn_2O_4$, activated carbon, and organic compounds capable of oxidation/reduction are used as the positive electrode active material. Examples of organic compounds capable of oxidation/reduction include organic compounds having π electron cloud in the molecule, such as a tetrathiafulvalene ring, and organic compounds having a stable radical in the molecule, such as a nitroxy radical. The electron conductive agent, ion conductive agent, and binder contained in the negative electrode active material layer can be the same electron conductive agent, ion conductive agent, and binder contained in the positive electrode active material layer.

The separator is, for example, a microporous sheet or film having predetermined ion permeability, mechanical strength, and an insulating property. The separator is, for example, woven fabric or non-woven fabric. Also, various resin materials are used for the separator, but polyolefins such as polyethylene and polypropylene are preferable in terms of durability, shut-down function, and battery safety. The shut-down function refers to a function that works when the amount of heat generated by a battery increases significantly, so that the pores therethrough are closed to suppress ion permeation, thereby shutting down the battery reaction.

The electrolyte is, for example, a liquid electrolyte, a solid electrolyte, or a gel electrolyte. The liquid electrolyte contains a solvent and a supporting salt. Examples of supporting salts are supporting salts commonly used in lithium ion batteries and non-aqueous type electric double layer capacitors.

Examples of supporting salts include supporting salts comprising a cation and an anion as listed below. Examples of cations includes cations of alkali metals such as lithium, sodium, and potassium, cations of alkaline earth metals such as magnesium, and cations of quarternary ammonium such as tetraethylammonium and 1,3-ethylmethyl imidazolium. These cations may be used alone or in combination of two or more. Among these cations, lithium is preferable.

Examples of anions includes halide anion, perchlorate anion, trifluoromethanesulfonate anion, tetrafluoroborate anion, trifluorohexafluorophosphate anion, trifluoromethanesulfonate anion, bis(trifluoromethanesulfonyl) imide anion, and bis(perfluoroethylsulfonyl)imide anion. These anions may be used alone or in combination of two or more.

The supporting salt is preferably a lithium salt comprising lithium and such an anion as listed above.

When the supporting salt itself is liquid, the supporting salt may or may not be mixed with a solvent. When the supporting salt is solid, it is preferable to dissolve the supporting salt in a solvent.

The solvent is an organic solvent used in lithium ion batteries and non-aqueous type electric double layer capacitors. Examples include ethylene carbonate, propylene carbonate, dimethyl carbonate, diethyl carbonate, methyl ethyl carbonate, γ-butyrolactone, tetrahydrofuran, dioxolane, sulfolane, dimethylformamide, and acetonitrile. These organic solvents may be used alone or in combination of two or more.

Examples of solid electrolytes include $Li_2S$—$SiS_2$-lithium compounds (at least one lithium compound selected from the group consisting of $Li_3PO_4$, LiI, and $Li_4SiO_4$), $Li_2S$—$P_2O_5$, $Li_2S$—$B_2S_5$, $Li_2S$—$P_2S_5$—$GeS_2$, sodium/alumina ($Al_2O_3$), amorphous polyethers with a low phase-transition temperature (Tg), amorphous vinylidene fluoride copolymers, polymer blends, and polyethylene oxide.

Examples of gel electrolytes include mixtures of a resin material, a solvent, and a supporting salt. Examples of resin materials include polyacrylonitrile, a copolymer of ethylene and acrylonitrile, and cross-linked polymers thereof. Examples of solvents are organic solvents of low molecular weight such as ethylene carbonate and propylene carbonate. The same supporting salts as those listed above may be used. The solid electrolyte or gel electrolyte can serve as the separator.

Also, examples of the power storage device of the invention include primary batteries, secondary batteries, capacitors, electrolytic capacitors, sensors, and electrochromic devices. Examples include fuel cells and redox-flow type power storage devices in which a triketone compound solution comprising a triketone compound dissolved in a solvent is supplied to an electrode by a liquid supply means to charge and discharge the electrode with the electrode active material dissolved in the solvent.

The power storage device of the invention can be advantageously used as the power source for transport devices and electronic devices; power storage devices for leveling out power generation such as thermal power generation, wind power generation, and fuel cell power generation; power sources such as emergency power storage systems for houses and apartments, and midnight power storage systems; uninterruptible power supplies; etc.

The electronic device of the invention is equipped with the power storage device of the invention as the power source. That is, the electronic device of the invention can have the same configuration as conventional electronic devices except that it includes the power storage device of the invention as the power source. Examples of the electronic device of the invention include portable electronic devices such as cell phones, mobile devices, personal digital assistants (PDA), notebook personal computers, video cameras, and game machines, power tools, vacuum cleaners, and robots. Among them, portable electronic devices are preferable.

FIG. 1 is a schematic perspective view of the structure of a cell phone 30 which is an embodiment of the invention. The cell phone 30 includes a housing 40. The housing 40 is composed of two foldable cases. The outer face of one case has a display 41, while the outer face of the other case has a keyboard 42. The display 41 is, for example, a liquid crystal panel. Also, the case with the keyboard 42 contains a power source 43 and an electronic control circuit, which are not shown.

The power source 43 is equipped with a power storage device. The power storage device can be composed only of a power storage device of the invention, or can be composed of a combination of a power storage device of the invention and a conventional power storage device. Examples of conventional power storage devices include lithium ion secondary batteries, nickel-metal hydride storage batteries, capacitors, and fuel cells.

The electronic control circuit controls, for example, the state of charge (SOC) of the power storage device of the power source 43, the voltage of the power storage device during charge, the display of the liquid crystal panel, transmitting/receiving, etc.

The power storage device of the invention can be made compact and thin. Thus, the space necessary for the installation of the power storage device can be reduced, and the cell phone can be made compact and thin. Since the power storage device of the invention can be charged at high speeds, the charging time can be shortened. Since the power storage device of the invention has a high output and a high capacity, it enables high performance such as enlargement of continuous talk time of the cell phone.

Figure 2:
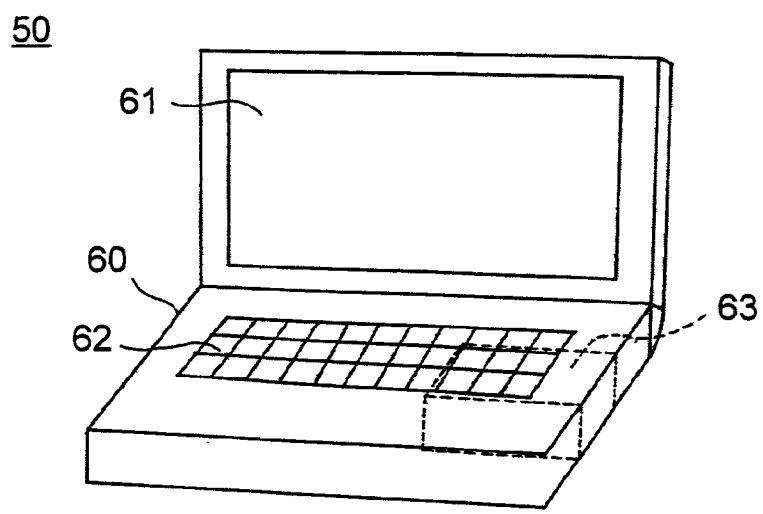
FIG. 2 is a schematic perspective view of the structure of a notebook personal computer which is an embodiment of the invention.

FIG. 2 is a schematic perspective view of the structure of a notebook personal computer 50 (hereinafter "PC 50") which is an embodiment of the invention. The PC 50 includes a housing 60. The housing 60 is composed of two foldable cases. The outer face of one case has a display 61, while the outer face of the other case has a keyboard 62. The display 61 is, for example, a liquid crystal panel. Also, the case with the keyboard 62 contains a power source 63, an electronic control circuit, a cooling fan, etc., which are not shown.

The electronic control circuit includes a CPU, a memory, a timer, etc., and controls various operations of the PC 50.

The power source 65 is equipped with a power storage device of the invention. The power source 65 may be equipped with only a power storage device of the invention, or may be equipped with a combination of a power storage device of the invention and a conventional power storage device. Examples of conventional power storage devices include lithium ion batteries, nickel-metal hydride storage batteries, capacitors, and fuel cells.

The power storage device of the invention can be made compact and thin. Thus, the space necessary for the installation of the power storage device can be reduced, and the notebook personal computer can be made compact and thin. Since the power storage device of the invention can be charged at high speeds, the charging time can be shortened. Since the power storage device of the invention has a high output and a high capacity, it enables the notebook personal computer to be used for a long time and started up at a high speed.

The transport device of the invention includes a power storage device of the invention as a main power source or auxiliary power source. That is, the transport device of the invention can have the same configuration as conventional transport devices except that it includes the power storage device of the invention as a main power source or auxiliary power source. Examples of the transport device of the invention include automobiles including secondary batteries, such as electric vehicles, hybrid electric vehicles, fuel cell cars, and plug-in HEVs.

Figure 3:
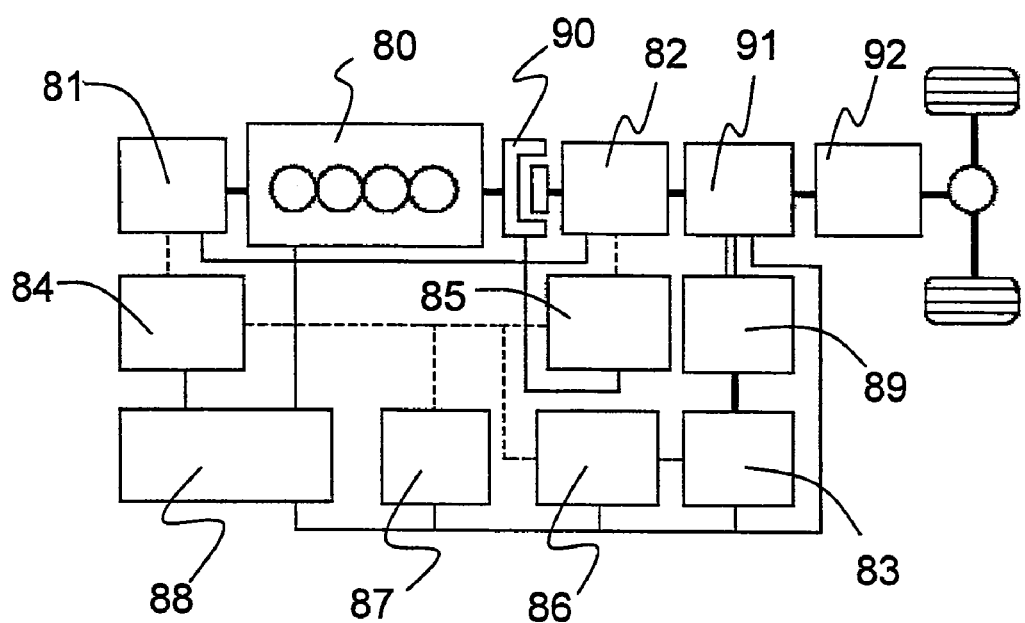
FIG. 3 is a schematic block diagram of the structure of a hybrid electric vehicle which is an embodiment of the invention.

FIG. 3 is a schematic block diagram of the structure of a hybrid electric vehicle 70 which is an embodiment of the invention. The hybrid electric vehicle 70 includes an engine 80, a plurality of motors 81, 82, and 83, inverters 84, 85, and 86, a power source 87, a controller 88, a hydraulic device 89, a clutch 90, a continuously variable transmission (CVT) 91, and a reduction gear 92.

The motor 81 is a motor for starting up the engine 80 or assisting the start-up, and also serves as a power generator. The motor 82 is a motor for driving a car. The motor 83 is a motor for power steering. The inverters 84, 85, and 86 are connected to the motors 81, 82, and 83 to transmit the power from the motors 81, 82, and 83, respectively.

The power source 87 supplies the motor 81, 82, and 83 with electric power for the rotation thereof. The power source 87 is equipped with a power storage device of the invention. The power source 87 may use only a power storage device of the invention, or may use a combination of a power storage device of the invention and a conventional power storage device. Examples of conventional power storage devices include lithium ion batteries, nickel-metal hydride storage batteries, capacitors, and fuel cells.

The controller 88 controls the whole system. The hydraulic device 89 is connected to the motor 83.

In the hybrid electric vehicle 70, first, the power source 87 is discharged (electric power is supplied) to drive the motor 81, which starts up the engine 80 or assists the start-up, and to drive the motor 83 connected to the hydraulic device 89 at a high speed. In charging the power storage device of the power source 87, the motor 81 is used as a power generator and the driving power of the engine 80 is converted to electric power.

Since the power storage device of the invention can be made compact and thin, the weight of transport devices such as automobiles can be reduced. Also, the space necessary for the installation of the power storage device can be reduced, and the space for storage and seats can be enlarged. Since the power storage device of the invention is capable of high speed charge/discharge and has a high output and a high capacity, it permits various driving modes, thus contributing to improvement in fuel efficiency of automobiles.

EXAMPLES

Examples of the invention are hereinafter described in details. These Examples are not to be construed as limiting in any way the invention.

Example 1

Figure 4:
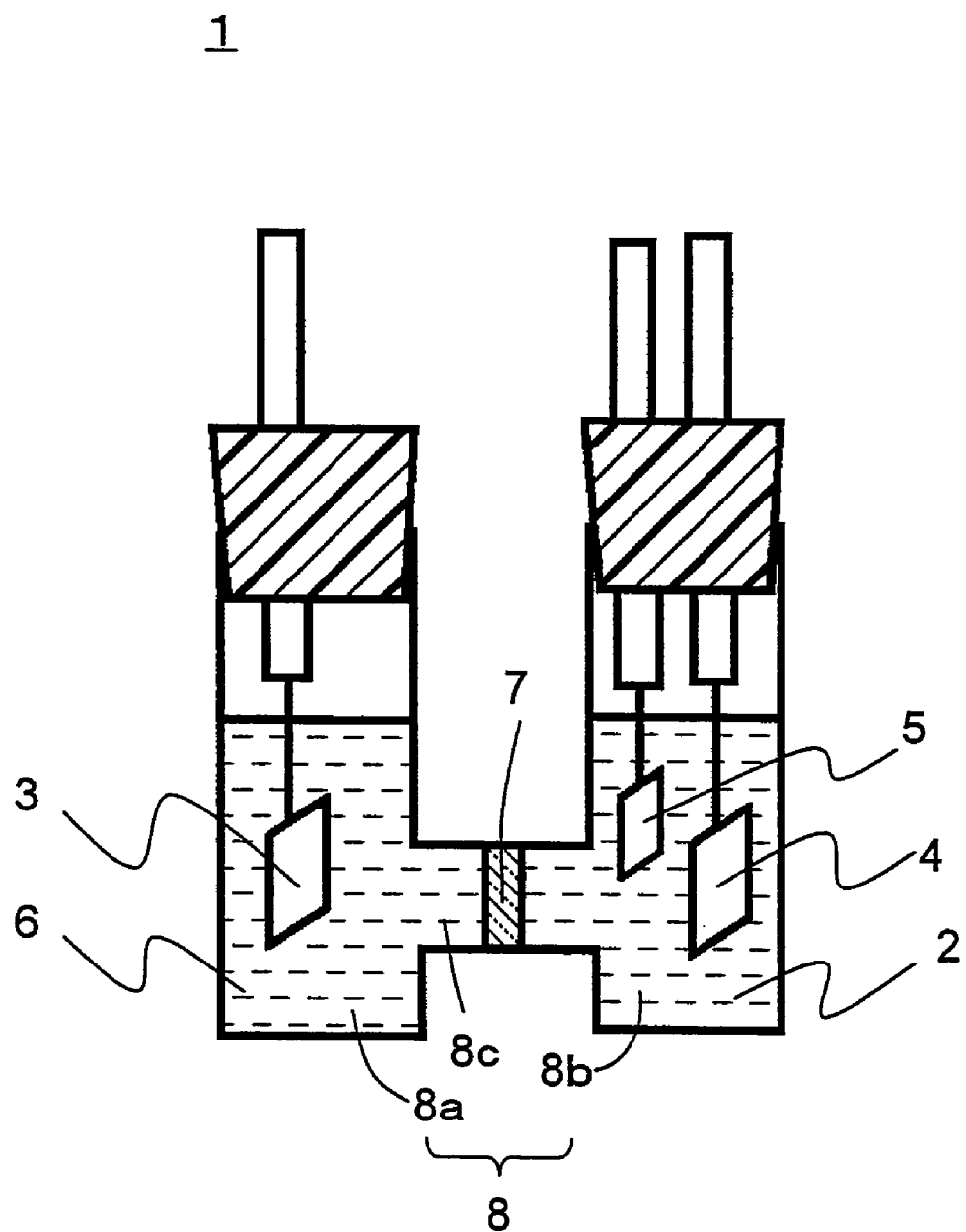
FIG. 4 is a schematic longitudinal sectional view of the structure of a power storage device which is an embodiment of the invention.

A three-electrode power storage device illustrated in FIG. 4 was produced in the following manner, in which a triketone compound dissolved in an electrolyte was used as the positive electrode active material, and lithium metal was used for the negative electrode and reference electrode. FIG. 4 is a schematic longitudinal sectional view of the structure of a power storage device 1 which is an embodiment of the invention.

(1) Preparation of Positive Electrode Active Material

Ninhydrin (available from Aldrich Corporation) represented by the chemical structural formula (10) was introduced into a glass flask as the starting material, and heat treated at 300° C. in a vacuum to synthesize 1,2,3-indantrione (triketone compound 2a) represented by the chemical structural formula (2a). This was used as the positive electrode active material.

[Chemical Formula 13]

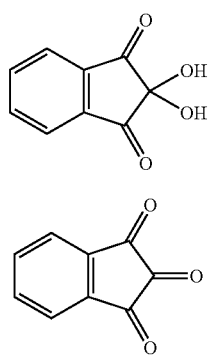

(10)

(2a)

(2) Production of Power Storage Device

The power storage device 1 was produced in a glove box equipped with a gas purifying device and having an argon atmosphere therein. A glass cell 8 has a first electrode storage portion 8a, a second electrode storage portion 8b, and a connecting portion 8c. Each of the first electrode storage portion 8a and the second electrode storage portion 8b accommodates an electrode. The connecting portion 8c connects the first electrode storage portion 8a with the second electrode storage portion 8b.

The first electrode storage portion 8a of the cell 8 was charged with an electrolyte 6 comprising the positive electrode active material dissolved in an electrolyte 2 at a concentration of 5 mmol/L. The electrolyte 2 is a 0.1 mol/L propylene carbonate solution of lithium fluoroborate. Disposed in the first electrode storage portion 8a was a positive electrode 3 for oxidizing and reducing the positive electrode active material. The positive electrode 3 was immersed in the electrolyte 6. A glassy carbon electrode with a diameter of 3 mm (available from BAS Inc.) was used as the positive electrode 3.

The second electrode storage portion 8b was charged with the electrolyte 3. Disposed in the second electrode storage portion 8b were a negative electrode 4 and a reference electrode 5. The negative electrode 4 and the reference electrode 5 were immersed in the electrolyte 2. The negative electrode 4 was prepared by attaching a lithium metal plate (thickness 300 μm) to a nickel current collector plate of 10-mm square mesh. The reference electrode 5 was prepared by attaching lithium metal (thickness 300 μm) to a nickel current collector plate of 7-mm square mesh.

The connecting portion 8c was fitted with a glass filter 7. The glass filter 9 separates the electrolyte 2 from the electrolyte 6, preventing the positive electrode active material from mixing with the electrolyte 2 on the negative electrode side. In this way, a power storage device of the invention was produced.

Example 2

A power storage device of the invention was produced in the same manner as in Example 1, except that the positive electrode active material was changed to the following triketone compound (3a) (substance name: tropoquinone).

The triketone compound (3a) was synthesized according to a known method (Tetrahedron Lett. 1978, 15, 1299), using tropolone (available from Aldrich Corporation) represented by the chemical structural formula (11) as the starting substance.

[Chemical Formula 14]

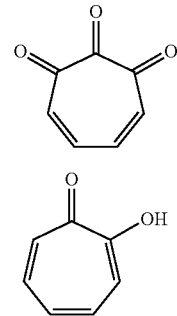

(3a)

(11)

Example 3

A power storage device of the invention was produced in the same manner as in Example 1, except that the positive electrode active material was changed to the following triketone compound (3c) (substance name: 2,7-dihydroxytropone bislithium alkoxide).

The triketone compound (3c) was synthesized in the following manner, using 2,7-dihydroxytropone represented by the chemical structural formula (12) as the starting substance.

78 mg of 2,7-dihydroxytropone (0.56 mmol) represented by the chemical structural formula (12) was dissolved in 5.0 ml of tetrahydrofuran (hereinafter "THF"). This solution was mixed with 16 mg of lithium hydride (2.0 mmol) and stirred at room temperature in an argon atmosphere for 5 minutes, to cause a reaction. After the completion of stirring, the reaction liquid was filtered, and THF was removed at a reduced pressure from the resultant filtrate, which was then dried in a vacuum to obtain 90 mg (93%) of 2,7-dihydroxytropone bis-lithium alkoxide (triketone compound (3c) in the form of a yellow solid.

IR(THF); 1521, 1413, 1282, 1193, 1054 cm$^{-1}$ 2,7-dihydroxytropone represented by the chemical structural formula (12) was synthesized according to a known method (Synthesis, 1986, p 578-579), using tropolone (available from Aldrich Corporation) represented by the chemical structural formula (11).

[Chemical Formula 15]

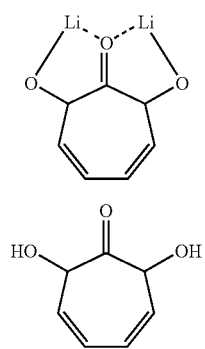

Comparative Example 1

A power storage device was produced in the same manner as in Example 1, except that anthraquinone (available from Aldrich Corporation) represented by the following chemical structural formula (13) and serving as a paraquinone compound was used as the positive electrode active material.

Comparative Example 2

A power storage device was produced in the same manner as in Example 1, except that 9,10-phenanthrenequinone (available from Aldrich Corporation) represented by the following chemical structural formula (14) and serving as an orthoquinone compound was used as the positive electrode active material.

[Chemical Formula 16]

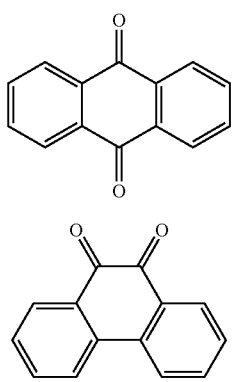

[Evaluation]

The power storage devices of Examples 1 to 3 and Comparative Examples 1 to 2 were evaluated in the following manner. The evaluation of these power storage devices was made in an argon glove box with a gas purifying device.

The positive electrode of each power storage device was subjected to a potential scan to evaluate the reversibility of reduction (discharge) reaction and oxidation (charge) reaction of the positive electrode active material. Specifically, in a predetermined potential range, the potential scan was performed from natural potential (equilibrium potential) toward the discharge side (negative direction), and then the potential scan was reversed toward the charge side (positive direction). This potential scan with a reversal was performed three times in the predetermined potential range. The scanning potential range was suitably adjusted to a potential range having peaks corresponding to the oxidation-reduction reactions of each positive electrode active material. Specifically, the scanning potential range was set to 1.0 to 4.0 V for Example 1 and Comparative Examples 1 and 2, and to 1.0 to 4.5 V for Examples 2 and 3. The scan speed was set to 10 mV/sec.

For the device evaluation, the same measurement was repeated three times to confirm that the three measurements showed almost the same behavior, and thereafter, the average discharge potential [V] and reaction reversibility were evaluated from the third behavior.

Also, on the assumption that the reaction of the active material is a two-electron reaction, the theoretical capacity per weight was calculated from the molecular weight M [g/mol] of the organic compound serving as the active material and Faraday constant (96500 [Coulomb/mol]) according to the following formula.

(Theoretical capacity[mAh/g])=2×96500/$M$×1000/ 3600

Also, the average discharge potential of the positive electrode was determined by obtaining the integral of the peak current value from the current (reduction) peak upon the potential scan toward the discharge side to calculate the amount of peak electricity and the amount of peak electric power, and dividing the thus obtained amount of discharge peak electric power by the amount of discharge peak electricity.

Table 7 shows the results.

TABLE 7

| | | Positive electrode evaluation item | |
|---|---|---|---|
| | Positive electrode active material | Theoretical capacity (mAh/g) | Average discharge potential (V) |
| Example 1 | Triketone compound (2a) | 334.9 | 2.7 |
| Example 2 | Triketone compound (3a) | 393.9 | 2.9 |
| Example 3 | Triketone compound (3c) | 357.6 | 2.9 |
| Comp. Example 1 | Paraquinone compound (13) | 257.5 | 2.2 |
| Comp. Example 2 | Orthoquinone compound (14) | 257.5 | 2.55 |

Figure 5:
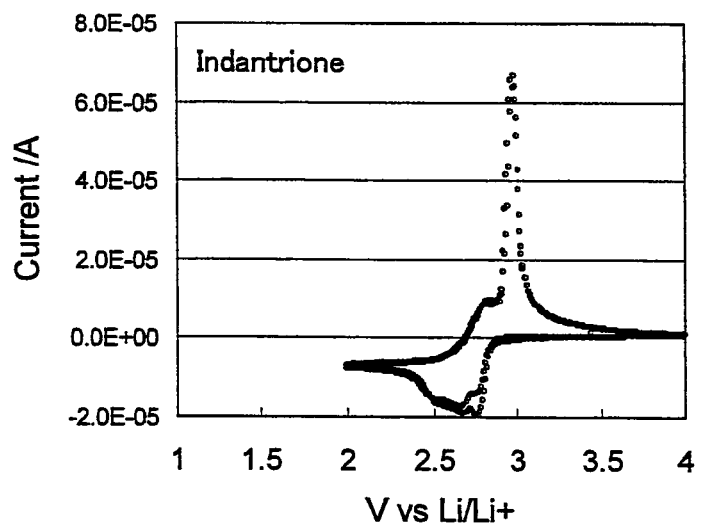
FIG. 5 is a cyclic voltammogram of a power storage device of Example 1.
Figure 6:
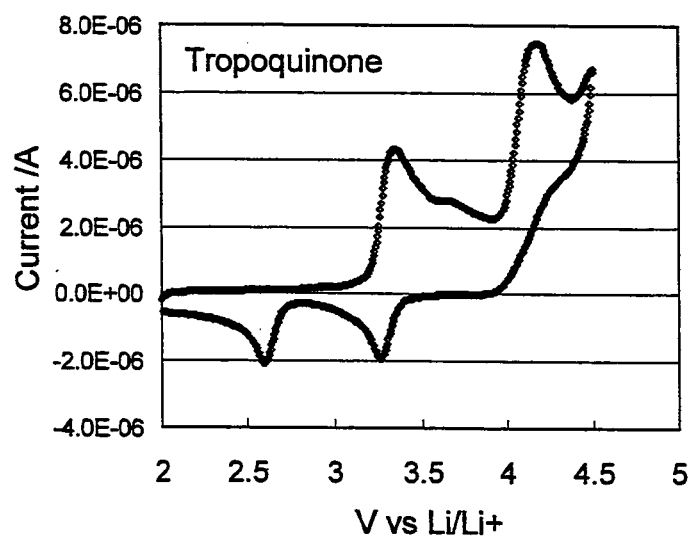
FIG. 6 is a cyclic voltammogram of a power storage device of Example 2.
Figure 7:
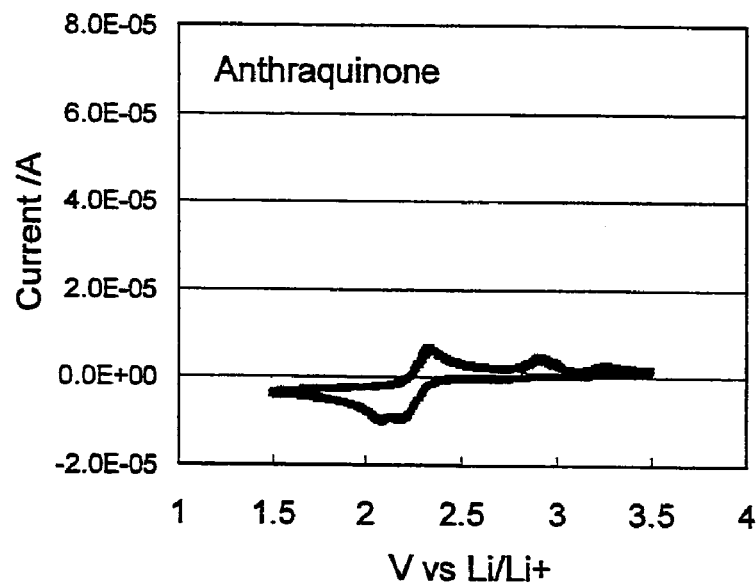
FIG. 7 is a cyclic voltammogram of a power storage device of Comparative Example 1.
Figure 8:
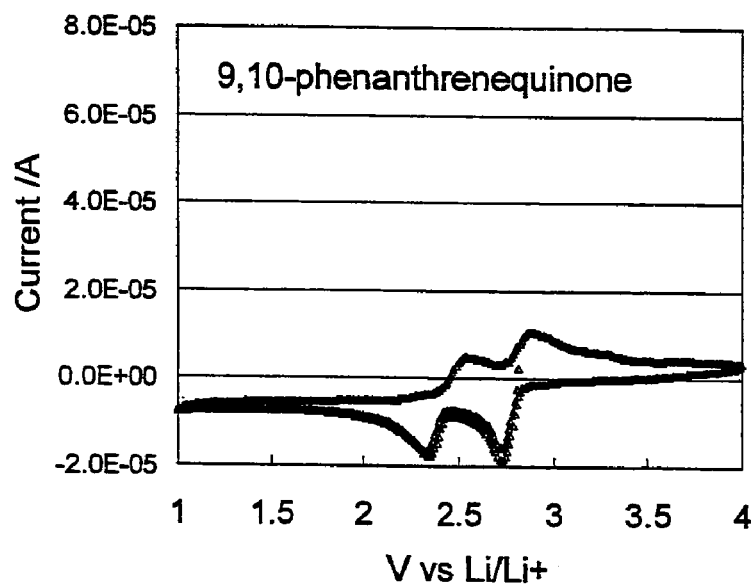
FIG. 8 is a cyclic voltammogram of a power storage device of Comparative Example 2.

The measurement results of power storage devices of Examples 1 and 2 are shown in FIGS. 5 and 6, respectively. FIG. 5 is a cyclic voltammogram of the power storage device of Example 1. FIG. 6 is a cyclic voltammogram of the power storage device of Example 2. Also, the measurement results of power storage devices of Comparative Examples 1 and 2 are shown in FIGS. 7 and 8, respectively. FIG. 7 is a cyclic voltammogram of the power storage device of Comparative Example 1. FIG. 8 is a cyclic voltammogram of the power storage device of Comparative Example 2.

As shown in FIG. 5, in the power storage device of Example 1 using the triketone compound (2a) as the active material, a reduction (discharge) reaction occurred around 2.7 V, and an oxidation (charge) reaction occurred around 3.0 V. It was confirmed that reversible charge/discharge reactions occurred at high potentials of approximately 3 V. The average discharge potential was 2.7 V. Also, up to the third cycle, the same charge/discharge behavior was obtained stably. Also, the theoretical capacity of the triketone compound (3a) was a very high value of 334.9 mAh/g.

As shown in FIG. 6, in the power storage device of Example 2 using the triketone compound (3a) as the active material, reduction (discharge) reactions occurred around 2.6 V and 3.2 V, and oxidation (charge) reactions occurred around 3.4 V and 4.2 V. It was confirmed that reversible charge/discharge reactions occurred at potentials of approximately 3.0 to 4.0 V. The average discharge potential was 2.9 V. Also, up to the third cycle, the same charge/discharge behavior was obtained stably. Also, the theoretical capacity of the triketone compound (3a) was a very high value of 393.9 mAh/g.

In the power storage device of Example 3 using the triketone compound (3c) as the active material, completely the same results as the results of Example 2 shown in FIG. 6 were obtained. That is, reduction (discharge) reactions occurred around 2.6 V and 3.2 V, and oxidation (charge) reactions occurred around 3.4 V and 4.2 V. It was confirmed that reversible charge/discharge reactions occurred at potentials of approximately 3.0 to 4.0 V. The average discharge potential was 2.9 V. Also, up to the third cycle, the same charge/discharge behavior was obtained stably. Also, the theoretical capacity of the triketone compound (3c) was a very high value of 357.6 mAh/g.

The triketone compound (3c) is composed of the triketone compound (3a) with Li added thereto, i.e., it is a reduced form (discharged state) of the triketone compound (3a). Therefore, the fact that the triketone compound (3c) and the triketone compound (3a) have the same electrochemical characteristics indicates that even if the synthesized triketone compound (electrode active material) is in either of an oxidized form (wherein Li is eliminated) and a reduced form (wherein Li is added), it can be used to produce a power storage device.

As shown in FIG. 7, in the power storage device of Comparative Example 1 using the paraquinone compound (13) as the active material, a reduction (discharge) reaction occurred around 2.2 V, and oxidation (charge) reactions occurred around 2.4 V and 2.9 V. It was confirmed that reversible charge/discharge reactions occurred at potentials of approximately 2.5 V. Also, the average discharge potential was 2.2 V. Up to the third cycle, the same charge/discharge behavior was obtained stably. Also, the theoretical capacity of the paraquinone compound (13) was 257.5 mAh/g.

As shown in FIG. 8, in the power storage device of Comparative Example 2 using the orthoquinone compound (14) as the active material, reduction (discharge) reactions occurred around 2.4 V and 2.7 V, and oxidation (charge) reactions occurred around 2.6 V and 2.9 V. It was confirmed that reversible charge/discharge reactions occurred at potentials of approximately 2.5 to 3.0 V. Also, the average discharge potential was 2.55 V. Up to the third cycle, the same charge/discharge behavior was obtained stably. Also, the theoretical capacity of the orthoquinone compound (14) was 257.5 mAh/g.

As is clear from Table 7, the power storage devices of Examples 1 to 3 of the invention using the triketone compounds as the active materials exhibited high theoretical capacities, high discharge voltages, and excellent reaction reversibility. This confirmed that the invention can provide a power storage device with a high energy density per weight. This confirmed that the invention can provide a power storage device with a high capacity, a high voltage, and good charge/discharge repeating characteristics.

Example 4

Figure 9:
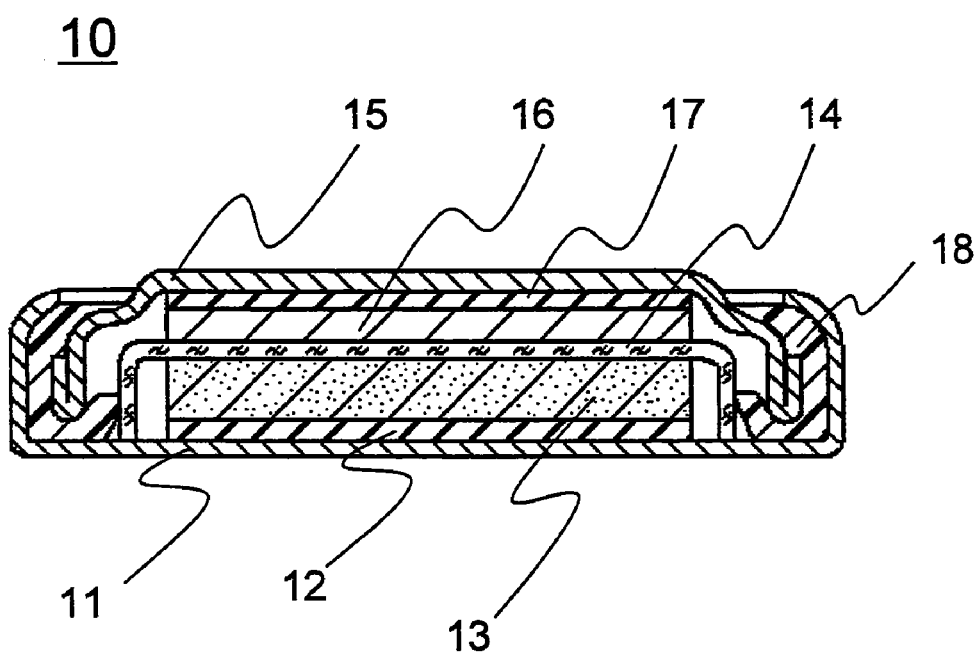
FIG. 9 is a schematic longitudinal sectional view of the structure of a coin battery which is an embodiment of the invention.

A coin battery was produced, using a triketone compound (2a) (1,2,3-indantrione) as the positive electrode active material. FIG. 9 is a schematic longitudinal sectional view of the structure of a coin battery 11 which is an embodiment of the invention.

(1) Preparation of Positive Electrode

In an argon box equipped with a gas purifying device, 20 mg of the positive electrode active material and 20 mg of acetylene black serving as a conductive agent were homogeneously mixed in an argon gas atmosphere. To the result mixture were added 1 ml of N-methyl-2-pyrrolidone serving as a solvent and 5 mg of polyvinylidene fluoride serving as a binder. They were homogeneously mixed to form a black slurry. The binder was used to bind the electrode active material and the conductive agent together.

The slurry was applied onto a surface of a 20-μm thick aluminum foil (current collector) and vacuum dried at room temperature for 2 hours to form an electrode plate. This electrode plate was punched out to a disc of 13.5 mm in diameter, to obtain a positive electrode in which a positive electrode active material layer 13 comprising a mixture of an active material, a conductive agent, and a binder is formed on a surface of a 20-μm thick positive electrode current collector 12.

(2) Production of Coin Battery 11

In FIG. 9, the positive electrode produced in the above manner is composed of the positive electrode current collector 12 made of aluminum foil, and the positive electrode active material layer 13 that contains the electrode active material and is formed on the positive electrode current collector 12. This positive electrode was mounted on a case 11 such that the positive electrode current collector 12 was in contact with the inner face of the case 11, and a separator 14 made of a porous polyethylene sheet was fitted thereon. Subsequently, a non-aqueous electrolyte was injected into the case 11. The non-aqueous electrolyte was prepared by dissolving lithium hexafluorophosphate at a concentration of 1.25 mol/L in a solvent mixture of ethylene carbonate and ethyl methyl carbonate (weight ratio 1:3).

A negative electrode current collector 17 and a negative electrode active material layer 16 were bonded under pressure to the inner face of a seal plate 15 in this order. The negative electrode active material layer 16 had a thickness of 300 μm and was made of metal Li. The negative electrode current collector 17 was made of a 100-μm thick stainless steel foil. The case 11 with the positive electrode and the seal plate 15 with the negative electrode were engaged with each other, with a gasket fitted to the periphery thereof, so that the negative electrode active material layer 16 was in contact with the separator 14. They were then crimped for sealing by a press. In this way, a coin battery of the invention with a thickness of 1.6 mm and a diameter of 20 mm was produced.

Example 5

A coin battery of the invention was produced in the same manner as in Example 4 except for the use of a triketone compound (2b) (substance name: 1,2,3-benzoindantrione) as the positive electrode active material instead of the triketone compound (2a).

The triketone compound (2b) was synthesized in the following manner. Benzoninhydrin (15) (221 mg, 0.97 mmol) synthesized by a known method (Journal of Organic Chemistry, 1969, 34, p 2339-2345) was placed in a Kugelrohr oven, and heated at 220° C. at a reduced pressure (0.6 mmHg) for 20 minutes to obtain 161 mg of a triketone compound (2b) in the form of a dark green solid. The yield was 79%. The structure of this compound was identified by $^1$H-NMR (400 MHz, DMSO-d$_6$). The chemical shift was δ; 8.17 (dd, J=6.4, 3.2 Hz, 2H), 8.34 (dd, J=6.0, 3.2 Hz, 2H), 8.69 (s, 2H).

[Chemical Formula 17]

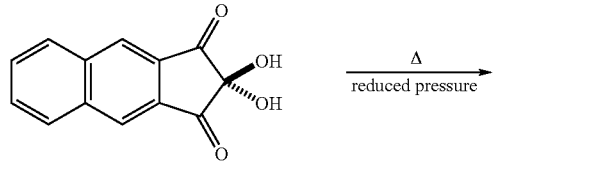

Example 6

A coin battery of the invention was produced in the same manner as in Example 4 except for the use of a triketone compound (2c) (substance name: 3-(1,2,3-trioxoindan-5-yl)thiophene) as the positive electrode active material instead of the triketone compound (2a).

The triketone compound (2c) was synthesized in the following manner. 2,2-dihydroxy-5-(thiophene-3-yl)indan-1,3-dione (16) (125 mg, 0.48 mmol) synthesized by a known method (Canadian Journal of Chemistry, 2001, 79, p 1632-1654) was placed in a Kugelrohr oven, and heated at 100 to 160° C. at a reduced pressure to obtain 55 mg (yield 47%) of a triketone compound (2c). The chemical shift in the NMR spectrum of the compound obtained was as follows.

$^1$H-NMR (400 MHz, DMSO-d$_6$) δ; 7.76 (dd, J=5.2, 3.2 Hz, 1H), 7.86 (dd, J=5.2, 1.2 Hz, 1H), 8.07 (d, J=8.0 Hz, 1H), 8.34 (d, J=1.2 Hz, 1H), 8.40 (dd, J=8.0, 1.6 Hz, 1H), 8.42 (dd, J=2.8, 1.2 Hz, 1H)

$^{13}$C-NMR (100 MHz, DMSO-d$_6$) δ; 119.9, 124.7, 125.6, 126.4, 128.1, 133.8, 138.6, 139.3, 141.0, 142.3, 182.8, 183.6, 187.1

[Chemical Formula 18]

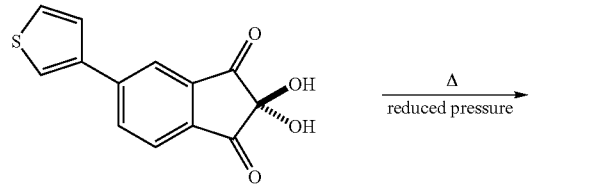

Example 7

A coin battery of the invention was produced in the same manner as in Example 4 except for the use of a multimer (4b) (substance name: 5,5'-indantrione dimer) as the positive electrode active material instead of the triketone compound (2a).

The multimer (4b) was synthesized in the following manner. A ninhydrin dimer (17) (85 mg, 0.24 mmol) synthesized by a known method (Canadian Journal of Chemistry, 2001, 79, p 1632-1654) was placed in a Kugelrohr oven, and heated at 300° C. at a reduced pressure (0.6 mmH) for 20 minutes, to obtain 32 mg of 5,5'-indantrione dimer (4b) in the form of a reddish brown solid. The yield was 42%. This compound showed absorption at wavelengths of 1774, 1750, 1725, 1600, and 1244 cm$^{-1}$ in the infrared absorption spectrum measurement.

[Chemical Formula 19]

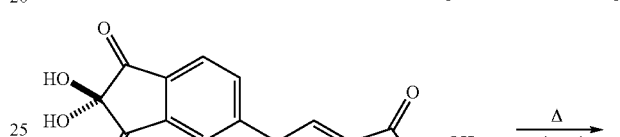

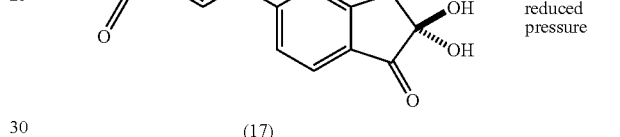

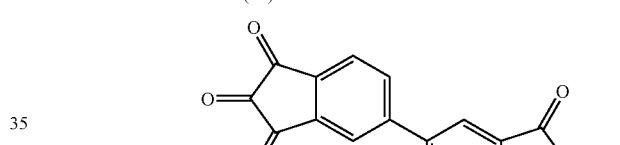

Example 8

A coin battery of the invention was produced in the same manner as in Example 4 except for the use of an aromatic-ring containing polyketone compound (5a) (substance name: 1,4-bis(1,2,3-trioxoindan-5-yl)benzene) as the positive electrode active material instead of the triketone compound (2a). The aromatic-ring containing polyketone compound (5a) was synthesized by a method having three steps which included the preparation of 1,4-bis(2,2-dimethoxy-1,3-dioxoindan-5-yl)benzene and 1,4-bis(2,2-dihydroxy-1,3-dioxoindan-5-yl)benzene. The synthesis method is described below.

[Chemical Formula 20]

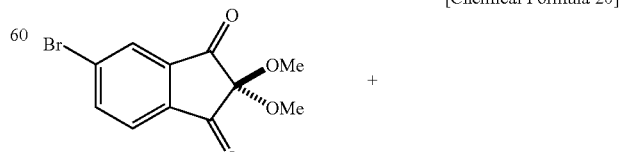

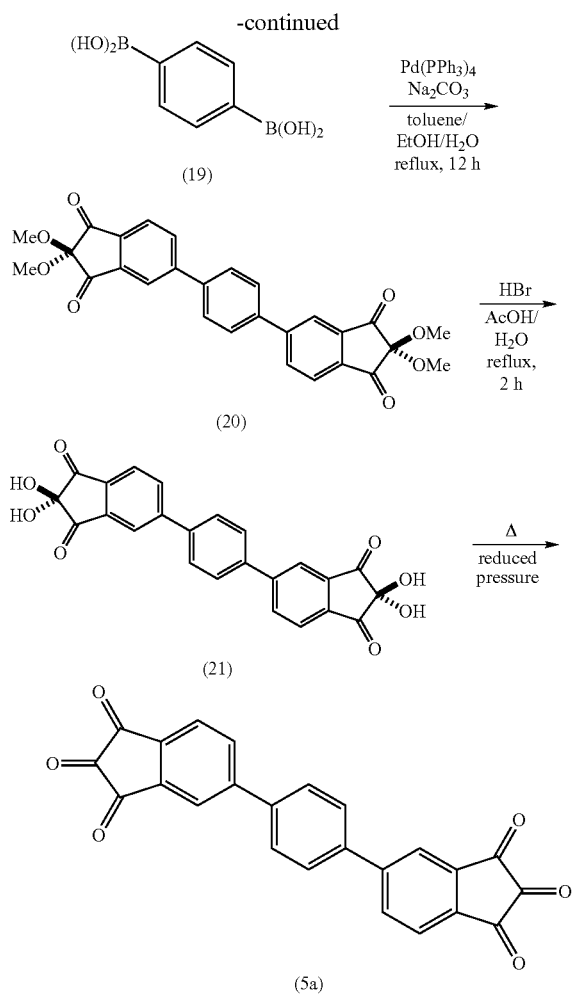

(1) Synthesis of 1,4-bis(2,2-dimethoxy-1,3-dioxoindan-5-yl)benzene (20) Through Suzuki-Miyaura Coupling Reaction Between 5-bromo-2,2-dimethoxyindan-1,3-dione (18) and benzene-1,4-diboronic Acid (19)

5-bromo-2,2-dimethoxyindan-1,3-dione (18) (624 mg, 2.19 mmol) and benzene-1,4-diboronic acid (19) (166 mg, 1.00 mmol) were dissolved in toluene (4 ml) and ethanol (2 ml), and the resultant solution was mixed with a 2M sodium carbonate aqueous solution (2 ml, 4 mmol). After deaeration, Pd(PPh$_3$)$_4$ (58 mg, 0.050 mmol) was added to the solution, which was then refluxed in an argon atmosphere for 12 hours. The reaction liquid was poured into water and extracted with chloroform. The extracted liquid was dried with sodium sulfate and filtered, and the solvent was removed at a reduced pressure. The residue was mixed with ethyl acetate, filtered, and vacuum dried to obtain 295 mg (60%) of 1,4-bis(2,2-dimethoxy-1,3-dioxoindan-5-yl)benzene (20) in the form of a beige solid. The readings for this compound are as follows $^1$HNMR (400 MHz, CDCl$_3$) δ; 3.70 (s, 12H), 7.82 (d, J=0.8 Hz, 4H), 8.10 (d, J=8.0 Hz, 2H), 8.17 (dt, J=8.4, 1.6 Hz, 2H), 8.24 (s, 2H).

$^{13}$CNMR (100 MHz, CDCl$_3$) δ; 51.9, 91.2, 122.1, 124.8, 128.3, 135.3, 138.2, 139.2, 140.0, 148.4, 192.7, 193.2.

Calculated value of C$_{28}$H$_{22}$O$_8$ by HRMS (EI) m/z: 486.1315, and theoretical value: 486.1312.

(2) Synthesis of 1,4-bis(2,2-dihydroxy-1,3-dioxoindan-5-yl)benzene Through Deprotection Reaction of Ketal 1,4-bis(2,2-dimethoxy-1,3-dioxoindan-5-yl)benzene (20) (209 mg, 0.429 mmol) was suspended in a solvent mixture of 3 ml of acetic acid and 3 ml of water, and the suspension was mixed with 3 ml of 47% hydrobromic acid. The mixture was refluxed for 2 hours. It was then cooled to room temperature to deposit a solid, which was collected by filtration. The solid was washed with cold water and chloroform and vacuum dried to obtain 168 mg (91%) of 1,4-bis(2,2-dihydroxy-1,3-dioxoindan-5-yl)benzene (21) in the form of a light gray solid. The readings for this compound are as follows.

$^1$HNMR (400 MHz, DMSO-d$_6$) δ; 7.57 (br, 3.2H), 8.07 (s, 4H), 8.11 (d, J=7.6 Hz, 2H), 8.33 (s, 2H), 8.45 (d, J=8.0 Hz, 2H).

$^{13}$CNMR (100 MHz, DMSO-d$_6$) δ; 87.8, 121.1, 124.4, 128.1, 135.3, 137.1, 138.2, 139.0, 147.2, 196.0, 196.5.

Calculated value for C$_{24}$H$_{14}$O$_8$ by HRMS (FAB) m/z: 430.0689, and theoretical value: 430.0690.

IR (neat); 3456 (br), 1750, 1723, 1598, 1148, 1086 cm$^{-1}$.

(3) Synthesis of Aromatic-Ring Containing Polyketone Compound (5a) Through Dehydration Reaction of Ninhydrin Moiety 1,4-bis(2,2-dihydroxy-1,3-dioxoindan-5-yl)benzene (21) (131 mg, 0.304 mmol) was placed in a Kugelrohr oven, and heated at 300° C. at a reduced pressure (0.6 mmHg) for 20 minutes, to obtain 118 mg (98%) of an aromatic-ring containing polyketone compound (5a) in the form of a reddish brown solid. The readings for this compound are as follows.

IR (solid); 1766, 1735, 1708, 1582, 1281, 1235 cm$^{-1}$

Example 9

A coin battery of the invention was produced in the same manner as in Example 4 except for the use of an aromatic-ring containing polyketone compound (5b) (substance name: 1,3,5-tris(1,2,3-trioxoindan-5-yl)benzene) as the positive electrode active material instead of the triketone compound (2a). The aromatic-ring containing polyketone compound (5b) was synthesized according to the following reaction process formulas by a method having four steps which included the preparation of 2,2-dimethoxyindan-1,3-dione-5-boronic acid pinacol ester, 1,3,5-tris(2,2-dimethoxy-1,3-dioxoindan-5-yl)benzene, and 1,3,5-tris(2,2-dihydroxy-1,3-dioxoindan-5-yl)benzene. The synthesis method is described below.

[Chemical Formula 21]

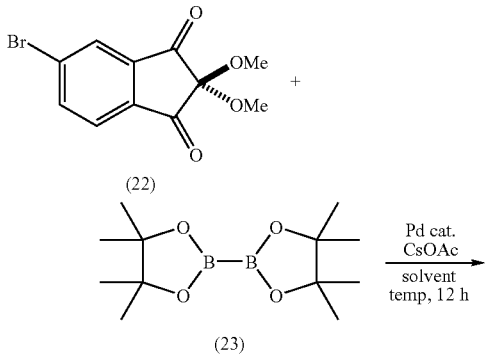

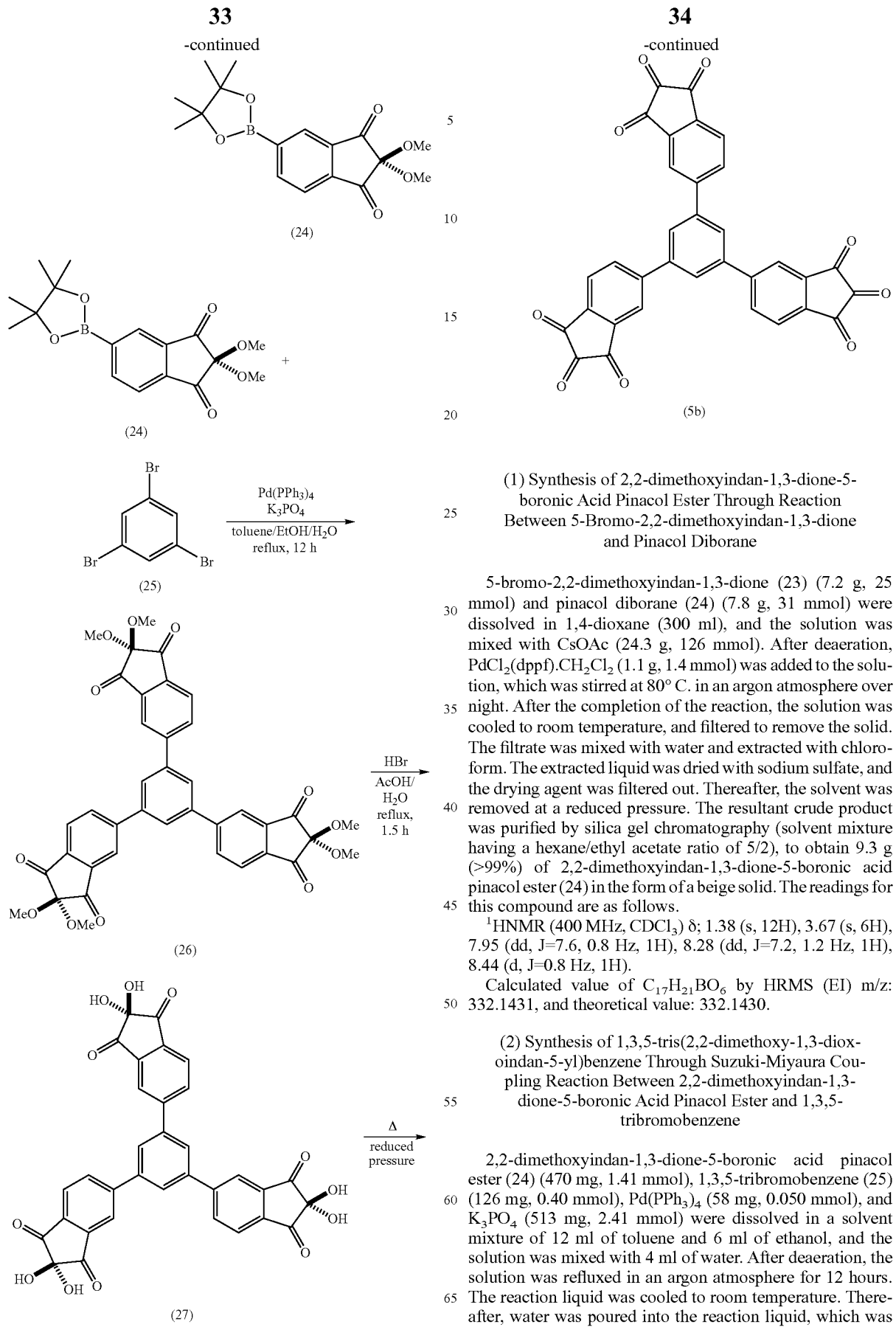

(1) Synthesis of 2,2-dimethoxyindan-1,3-dione-5-boronic Acid Pinacol Ester Through Reaction Between 5-Bromo-2,2-dimethoxyindan-1,3-dione and Pinacol Diborane 5-bromo-2,2-dimethoxyindan-1,3-dione (23) (7.2 g, 25 mmol) and pinacol diborane (24) (7.8 g, 31 mmol) were dissolved in 1,4-dioxane (300 ml), and the solution was mixed with CsOAc (24.3 g, 126 mmol). After deaeration, $PdCl_2(dppf) \cdot CH_2Cl_2$ (1.1 g, 1.4 mmol) was added to the solution, which was stirred at 80° C. in an argon atmosphere overnight. After the completion of the reaction, the solution was cooled to room temperature, and filtered to remove the solid. The filtrate was mixed with water and extracted with chloroform. The extracted liquid was dried with sodium sulfate, and the drying agent was filtered out. Thereafter, the solvent was removed at a reduced pressure. The resultant crude product was purified by silica gel chromatography (solvent mixture having a hexane/ethyl acetate ratio of 5/2), to obtain 9.3 g (>99%) of 2,2-dimethoxyindan-1,3-dione-5-boronic acid pinacol ester (24) in the form of a beige solid. The readings for this compound are as follows.

$^1$HNMR (400 MHz, $CDCl_3$) δ; 1.38 (s, 12H), 3.67 (s, 6H), 7.95 (dd, J=7.6, 0.8 Hz, 1H), 8.28 (dd, J=7.2, 1.2 Hz, 1H), 8.44 (d, J=0.8 Hz, 1H).

Calculated value of $C_{17}H_{21}BO_6$ by HRMS (EI) m/z: 332.1431, and theoretical value: 332.1430.

(2) Synthesis of 1,3,5-tris(2,2-dimethoxy-1,3-dioxoindan-5-yl)benzene Through Suzuki-Miyaura Coupling Reaction Between 2,2-dimethoxyindan-1,3-dione-5-boronic Acid Pinacol Ester and 1,3,5-tribromobenzene 2,2-dimethoxyindan-1,3-dione-5-boronic acid pinacol ester (24) (470 mg, 1.41 mmol), 1,3,5-tribromobenzene (25) (126 mg, 0.40 mmol), $Pd(PPh_3)_4$ (58 mg, 0.050 mmol), and $K_3PO_4$ (513 mg, 2.41 mmol) were dissolved in a solvent mixture of 12 ml of toluene and 6 ml of ethanol, and the solution was mixed with 4 ml of water. After deaeration, the solution was refluxed in an argon atmosphere for 12 hours. The reaction liquid was cooled to room temperature. Thereafter, water was poured into the reaction liquid, which was then extracted with chloroform. The extracted liquid of organic phase was dried with sodium sulfate and then filtered to remove the drying agent. Thereafter, the solvent was removed at a reduced pressure. The crude product was purified by silica gel chromatography (the solvent was gradually changed from hexane to a 1:1 mixture of hexane:ethyl acetate), to obtain 280 mg (41%) of 1,3,5-tris(2,2-dimethoxy-1,3-dioxoindan-5-yl)benzene (26) in the form of a yellow solid. The readings for this compound are as follows.

$^1$HNMR (400 MHz, CDCl$_3$) δ; 3.68 (s, 18H), 8.01 (s, 3H), 8.13 (dd, J=8.0, 0.4 Hz, 3H), 8.24 (dd, J=8.0, 1.6 Hz, 3H), 8.29 (dd, J=1.6, 0.4 Hz, 3H).

$^{13}$CNMR (100 MHz, CDCl$_3$) δ; 51.7, 91.1, 122.5, 127.3, 135.7, 138.6, 140.1, 141.0, 148.0, 192.8, 193.3.

Calculated value of C$_{39}$H$_{30}$O$_{12}$ by HRMS (EI) m/z: 690.1737, and theoretical value: 690.1732.

(3) Synthesis of 1,3,5-tris(2,2-dihydroxy-1,3-dioxoindan-5-yl)benzene Through Deprotection Reaction of Ketal 1,3,5-tris(2,2-dimethoxy-1,3-dioxoindan-5-yl)benzene (26) (101 mg, 0.146 mmol) was suspended in a solvent mixture of 2 ml of acetic acid and 2 ml of water, and the suspension was mixed with 2 ml of 47% hydrobromic acid. The mixture was refluxed at 110° C. for 1.5 hours. After it was cooled to room temperature, the reaction solution was diluted with water, and the resulting solid was filtered and dried, to obtain 77.3 mg (87%) of 1,3,5-tris(2,2-dihydroxy-1,3-dioxoindan-5-yl)benzene (27) in the form of a gray solid. The readings for this compound are as follows.

$^1$HNMR (400 MHz, DMSO-d$_6$) δ; 7.61 (s, 6H), 8.15 (d, J=8.0 Hz, 3H), 8.69 (s, 3H), 8.72 (dd, J=8.0, 1.6 Hz, 3H).

$^{13}$CNMR (100 MHz, DMSO-d$_6$) δ; 88.0, 122.7, 124.3, 127.7, 136.5, 137.6, 139.3, 139.8, 147.8, 196.6, 197.1.

(4) Synthesis of Aromatic-Ring Containing Polyketone Compound (5b) Through Dehydration Reaction of Ninhydrin Moiety 1,3,5-tris(2,2-dihydroxy-1,3-dioxoindan-5-yl)benzene (27) (331 mg, 0.546 mmol) was placed in a Kugelrohr oven, and heated at 270° C. at a reduced pressure (0.6 mmHg), to obtain 282 mg (93%) of an aromatic-ring containing polyketone compound (5b) in the form of a yellow green solid. The readings for this compound are as follows.

$^1$HNMR (400 MHz, DMSO-d$_6$) δ; 8.17 (d, J=7.6 Hz, 3H), 8.52 (s, 3H), 8.73 (dd, J=8.0, 1.6 Hz, 3H), 8.76 (d, J=1.2 Hz, 3H).

$^{13}$CNMR (100 MHz, DMSO-d$_6$) δ; 122.4, 124.3, 127.6, 135.8, 139.3, 139.9, 140.6, 146.7, 183.2, 183.5, 186.8.

Example 10

A coin battery of the invention was produced in the same manner as in Example 4 except for the use of an aromatic-ring containing polyketone compound (5c) (substance name: 4,4'-bis(1,2,3-trioxoindan-5-yl)biphenyl) as the positive electrode active material instead of the triketone compound (2a). The aromatic-ring containing polyketone compound (5c) was synthesized by the following three steps according to the following reaction process formulas.

[Chemical Formula 22]

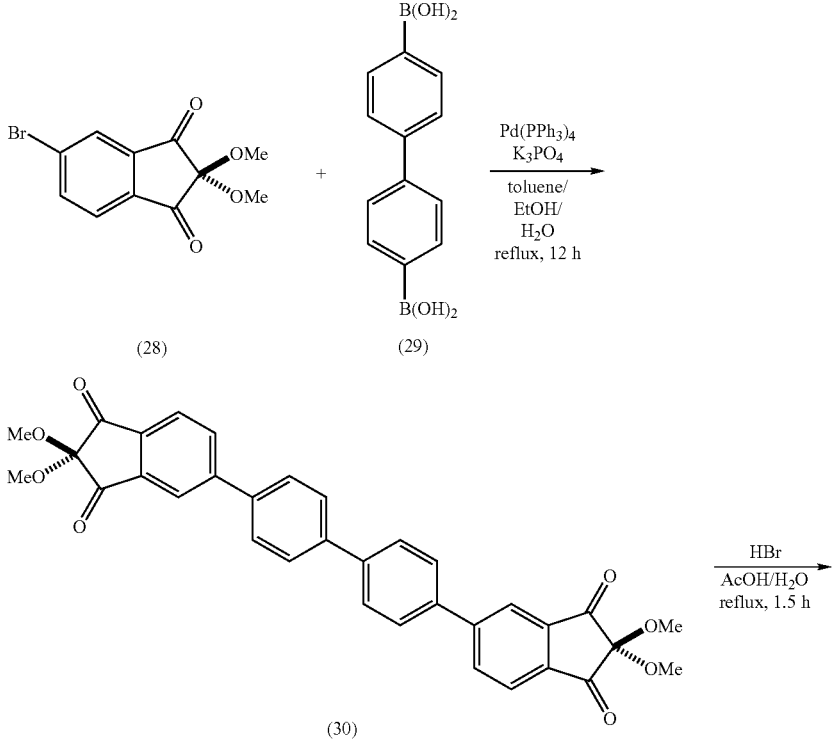

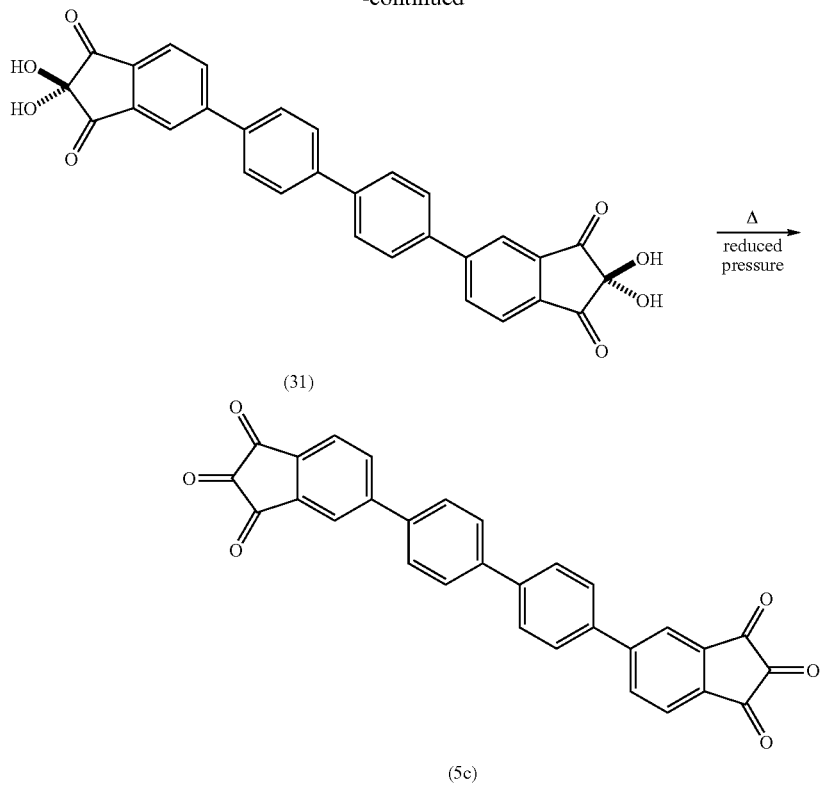

(1) Synthesis of 4,4'-bis(2,2-dimethoxy-1,3-dioxoindan-5-yl)biphenyl Through Suzuki-Miyaura Coupling Reaction Between 5-bromo-2,2-dimethoxyindan-1,3-dione and 4,4'-biphenyldiboronic Acid 5-bromo-2,2-dimethoxyindan-1,3-dione (28) (1.18 g, 4.13 mmol), 4,4'-biphenyldiboronic acid (29) (368 mg, 1.52 mmol), Pd(PPh$_3$)$_4$ (37 mg, 0.032 mmol), and sodium carbonate (327 mg, 3.09 mmol) were dissolved in a solvent mixture of 15 ml of toluene and 10 ml of ethanol, and the solution was mixed with 4 ml of water. After deaeration, the solution was heated and refluxed in an argon atmosphere over night. The reaction liquid was cooled to room temperature, and water was poured into the reaction liquid, which was then extracted with chloroform. The extracted liquid of organic phase was dried with sodium sulfate and then filtered to remove the drying agent. Thereafter, the solvent was removed at a reduced pressure. The resultant was purified by recrystallization (solvent; chloroform and hexane) to obtain 728 mg (85%) of 1,3-bis(2,2-dimethoxy-1,3-dioxoindan-5-yl)biphenyl (30) in the form of a yellow green solid. The readings for this compound are as follows.

$^1$HNMR (400 MHz, CDCl$_3$) δ; 3.71 (s, 12H), 7.79 (d, J=8.8 Hz, 4H), 7.82 (d, J=8.8 Hz, 4H), 8.09 (dd, J=8.0, 0.4 Hz, 2H), 8.18 (dd, J=8.0, 1.6 Hz, 2H), 8.25 (dd, J=1.6, 0.4 Hz, 2H).

$^{13}$CNMR (100 MHz, CDCl$_3$) δ; 51.9, 91.2, 121.8, 124.7, 127.8, 127.9, 135.2, 137.7, 138.0, 140.0, 140.8, 149.0, 192.7, 193.4.

(2) Synthesis of 4,4'-bis(2,2-dihydroxy-1,3-dioxoindan-5-yl)biphenyl Through Deprotection Reaction of 4,4'-bis(2,2-dimethoxy-1,3-dioxoindan-5-yl)biphenyl 4,4'-bis(2,2-dimethoxy-1,3-dioxoindan-5-yl)biphenyl (30) (567 mg, 1.01 mmol) was suspended in a solvent mixture of 6 ml of acetic acid and 6 ml of water, and the suspension was mixed with 47% hydrobromic acid (6 ml). The mixture was refluxed at 100° C. over night. It was then cooled to room temperature and filtered to obtain a solid, which was washed with chloroform and water and dried. Thereafter, it was further cleaned with acetone and dried at a reduced pressure, to obtain 286 mg (55%) of 4,4'-bis(2,2-dihydroxy-1,3-dioxoindan-5-yl)biphenyl (31) in the form of a beige solid. The readings for this compound are as follows.

$^1$HNMR (400 MHz, DMSO-d$_6$) δ; 7.58 (s, 4H), 7.97 (d, J=8.4 Hz, 4H), 8.04 (d, J=8.4 Hz, 4H), 8.12 (d, J=8.0 Hz, 2H), 8.32 (d, J=1.6 Hz, 2H), 8.45 (d, J=8.0, 1.6 Hz, 2H).

(3) Synthesis of Aromatic-Ring Containing Polyketone Compound (5c) Through Dehydration Reaction of 4,4'-bis(2,2-dihydroxy-1,3-dioxoindan-5-yl)biphenyl 4,4'-bis(2,2-dihydroxy-1,3-dioxoindan-5-yl)biphenyl (31) (286 mg, 0.56 mmol) was placed in a Kugelrohr oven and heated gradually at 100° C. to 250° C. at a reduced pressure, to obtain 245 mg (93%) of an aromatic-ring containing polyketone compound (5c) in the form of a vermilion solid. The readings for this compound are as follows.

$^1$HNMR (400 MHz, DMSO-d$_6$) δ; 7.99 (d, J=8.4 Hz, 4H), 8.08 (d, J=8.4 Hz, 4H), 8.13 (d, J=8.4 Hz, 2H), 8.35 (d, J=2.0 Hz, 2H), 8.43 (dd, J=8.4, 1.6 Hz, 2H).

Example 11

A coin battery of the invention was produced in the same manner as in Example 4 except for the use of an aromatic-ring containing polyketone compound (5d) (substance name: 1,3-bis(1,2,3-trioxoindan-5-yl)benzene) as the positive electrode active material instead of the triketone compound (2a). The aromatic-ring containing polyketone compound (5d) was synthesized by the following three steps according to the following reaction process formulas.

[Chemical Formula 23]

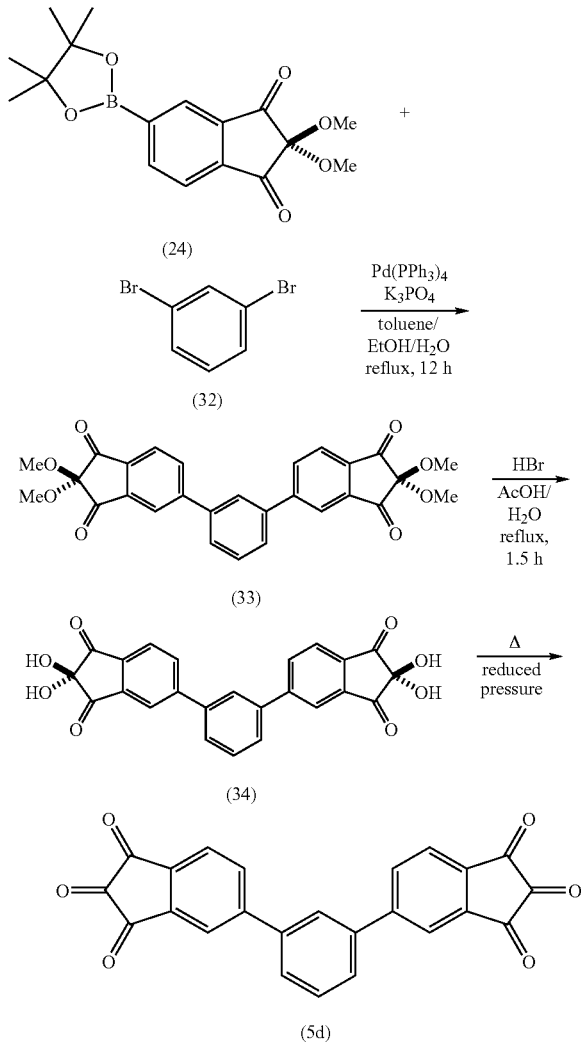

(1) Synthesis of 1,3-bis(2,2-dimethoxy-1,3-dioxoindan-5-yl)benzene Through Suzuki-Miyaura Coupling Reaction Between 2,2-dimethoxyindan-1,3-dione-5-boronic Acid Pinacol Ester and 1,3-dibromobenzene 2,2-dimethoxyindan-1,3-dione-5-boronic acid pinacol ester (24) (420 mg, 1.26 mmol), 1,3-dibromobenzene (32) (144 mg, 0.61 mmol), Pd(PPh$_3$)$_4$ (31 mg, 0.027 mmol), and K$_3$PO$_4$ (509 mg, 2.4 mmol) were dissolved in a solvent mixture of 7 ml of toluene and 4 ml of ethanol, and the solution was mixed with 3 ml of water. After deaeration, the solution was refluxed in an argon atmosphere over night. The reaction liquid was cooled to room temperature, and water was poured into the reaction liquid, which was then extracted with chloroform. The extracted liquid of organic phase was dried with sodium sulfate and filtered to remove the drying agent. Thereafter, the solvent was removed at a reduced pressure. The crude product was purified by silica gel chromatography (the hexane/ethyl acetate ratio was gradually changed from 5/1 to 5/2), to obtain 137 mg (46%) of 1,3-bis(2,2-dimethoxy-1,3-dioxoindan-5-yl)benzene (33) in the form of a yellow solid. The readings for this compound are as follows.

$^1$HNMR (400 MHz, CDCl$_3$) δ; 3.67 (s, 12H), 7.67 (dd, J=8.8, 6.8 Hz, 1H), 7.74-7.76 (m, 2H), 7.90 (pseudot, J=2.0 Hz, 1H), 8.09 (dd, J=8.0, 0.8 Hz, 1H), 8.17 (dd, J=7.6, 2.0 Hz, 2H), 8.21 (dd, J=1.6, 0.8 Hz, 2H).
$^{13}$CNMR (100 MHz, CDCl$_3$) δ; 51.7, 91.1, 122.2, 124.9, 126.5, 128.3, 130.3, 135.6, 138.3, 139.7, 140.5, 148.9, 192.9, 193.4.

(2) Synthesis of 1,3-bis(2,2-dihydroxy-1,3-dioxoindan-5-yl)benzene Through Deprotection Reaction of Ketal 1,3-bis(2,2-dimethoxy-1,3-dioxoindan-5-yl)benzene (33) (119 mg, 0.25 mmol) was suspended in a solvent mixture of 3 ml of acetic acid and 3 ml of water, and the suspension was mixed with 3 ml of 47% hydrobromic acid. This mixture was refluxed at 115° C. over night. After it was cooled to room temperature, the reaction solution was filtered to obtain a solid, which was then dried at a reduced pressure, to obtain 59 mg (56%) of 1,3-bis(2,2-dihydroxy-1,3-dioxoindan-5-yl)benzene (34) in the form of a beige solid. The readings for this compound are as follows.

$^1$HNMR (400 MHz, DMSO-d$_6$) δ; 7.59 (s, 4H), 7.72 (pseudot, J=7.6 Hz, 1H), 8.00 (dd, J=7.6, 2.0 Hz, 2H), 8.12 (dd, J=8.0, 0.8 Hz, 2H), 8.36 (pseudot, J=1.6 Hz, 1H), 8.47 (dd, J=1.6, 0.8 Hz, 2H), 8.53 (dd, J=8.0, 1.6 Hz, 2H).
$^{13}$CNMR (100 MHz, DMSO-d$_6$) δ; 87.9, 122.0, 124.5, 127.0, 128.4, 130.2, 136.1, 137.4, 138.9, 139.3, 148.1, 196.6, 197.0.

(3) Synthesis of Aromatic-Ring Containing Polyketone Compound (5d) Through Dehydration Reaction of Ninhydrin Moiety 1,3-bis(2,2-dihydroxy-1,3-dioxoindan-5-yl)benzene (34) (41 mg, 0.094 mmol) was placed in a Kugelrohr oven and heated at 280° C. at a reduced pressure for 5 hours, to obtain 28 mg (75%) of an aromatic-ring containing polyketone compound (5d) in the form of a yellow green solid. The readings for this compound are as follows.

$^1$HNMR (400 MHz, DMSO-d$_6$) δ; 7.75 (pseudot, J=7.6 Hz, 1H), 8.05 (dd, J=7.6, 2.0 Hz, 2H), 8.14 (dd, J=7.6, 1.2 Hz, 2H), 8.41 (pseudot, J=1.6 Hz, 1H), 8.52-8.55 (m, 4H).

Example 12

A coin battery of the invention was produced in the same manner as in Example 4 except for the use of an aromatic-ring containing polyketone compound (5e) (substance name: 3,4-bis(1,2,3-trioxoindan-5-yl)thiophene) as the positive electrode active material instead of the triketone compound (2a). The aromatic-ring containing polyketone compound (5e) was synthesized by the following three steps according to the following reaction process formulas.

[Chemical Formula 24]

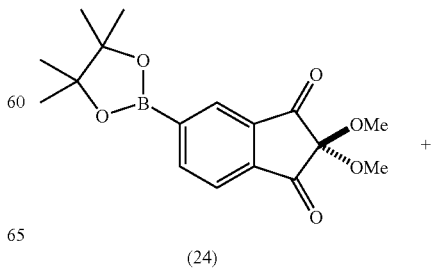

(24)

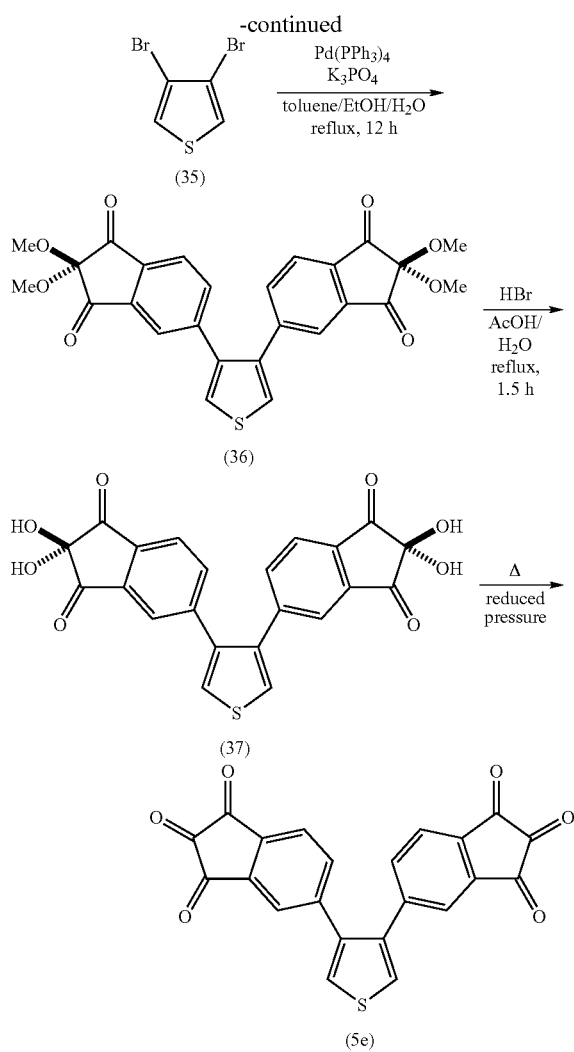

¹³CNMR (100 MHz, CDCl₃) δ; 51.8, 91.0, 123.8, 124.4, 128.0, 137.1, 138.1, 139.0, 139.9, 144.2, 192.7, 193.2.

(2) Synthesis of 3,4-bis(2,2-dihydroxy-1,3-dioxoindan-5-yl)thiophene Through Deprotection Reaction of Ketal 3,4-bis(2,2-dimethoxy-1,3-dioxoindan-5-yl)thiophene (36) (178 mg, 0.361 mmol) was suspended in a solvent mixture of 2 ml of acetic acid and 2 ml of water, and the suspension was mixed with 2 ml of 47% hydrobromic acid. The mixture was refluxed at 110° C. for 1.5 hours. After it was cooled to room temperature, the reaction solution was diluted with water and then left all day and night to obtain a solid. The solid was filtered, washed with water, and dried, to obtain 68 mg (43%) of 3,4-bis(2,2-dihydroxy-1,3-dioxoindan-5-yl)thiophene (37) in the form of a beige solid. The readings for this compound are as follows.

¹HNMR (400 MHz, acetone-d₆) δ; 6.55 (s, 4H), 7.80 (dd, J=7.6, 1.6 Hz, 2H), 7.91 (dd, J=7.6, 0.8 Hz, 2H), 7.95 (dd, J=1.6, 0.8 Hz, 2H), 8.03 (s, 2H).

¹³CNMR (100 MHz, acetone-d₆) δ; 79.6, 115.6, 115.9, 120.3, 129.5, 129.6, 131.1, 131.5, 136.3, 187.2, 187.5.

(3) Synthesis of Aromatic-Ring Containing Polyketone Compound (5e) Through Dehydration Reaction of 3,4-bis(2,2-dihydroxy-1,3-dioxoindan-5-yl)thiophene 3,4-bis(2,2-dihydroxy-1,3-dioxoindan-5-yl)thiophene (37) (103 mg, 0.246 mmol) was placed in a Kugelrohr oven, and heated at 100 to 180° C. at a reduced pressure (0.6 mmHg) for 210 minutes, to obtain 51.8 mg (53%) of an aromatic-ring containing polyketone compound (5e) in the form of a brown solid. The readings for this compound are as follows.

¹HNMR (400 MHz, acetone-d₆) δ; 7.91 (dd, J=8.0, 1.6 Hz, 2H), 8.00-8.03 (m, 4H), 8.12 (s, 2H).

[Charge/Discharge Evaluation]

The coin batteries of the invention produced in Examples 4 to 12 were subjected to a charge/discharge test in the following charge/discharge conditions. In the charge/discharge conditions, the current value was 0.2 C rate (5 hour rate) relative to the theoretical capacity of the coin battery, and the voltage range was 2.0 V to 4.0 V. The charge/discharge test was started with a discharge, and the stand-by time between a discharge and a charge, or between a charge and a discharge was set to 5 minutes. The charge/discharge test was repeated 10 times. From the initial discharge capacity of each power storage device, the charge/discharge capacity per gram of the positive electrode active material was calculated. Also, from the initial discharge potential, the average discharge potential was calculated. Table 8 shows the results.

Table 8 also shows the theoretical capacity of each active material and the utilization rate (%), which is the ratio of the actual charge/discharge capacity to the theoretical capacity of the active material.

Figure 10:
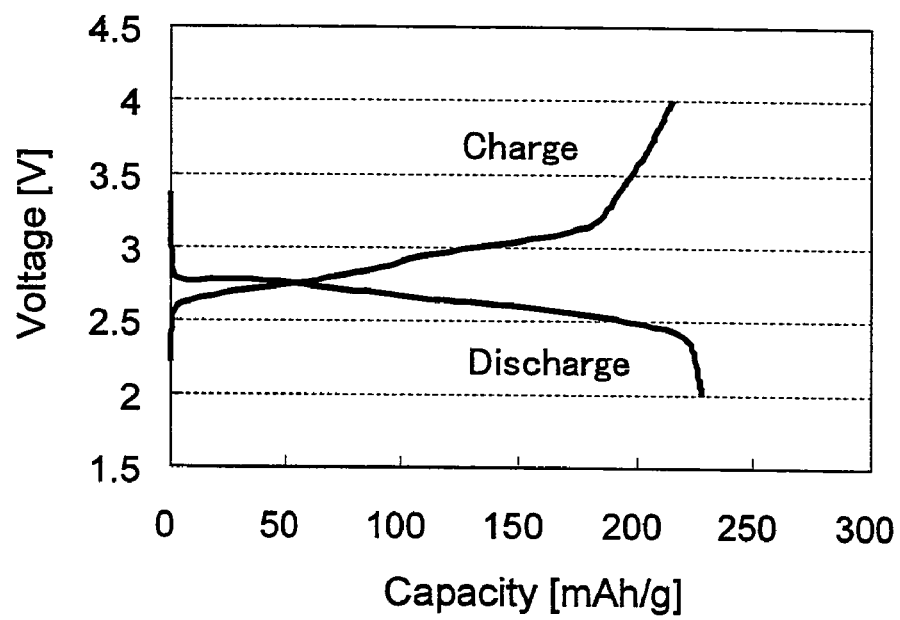
FIG. 10 is a charge/discharge curve of a coin battery of Example 4.
Figure 11:
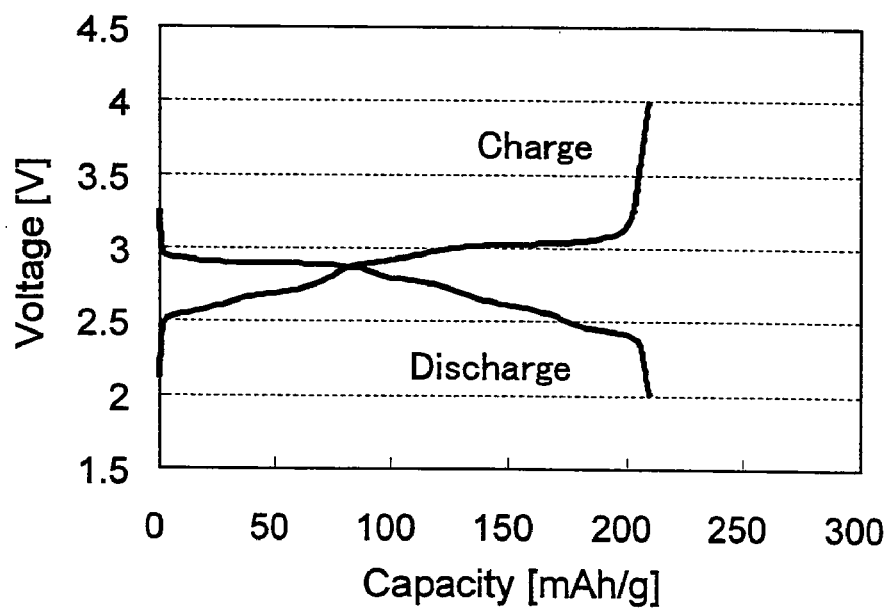
FIG. 11 is a charge/discharge curve of a coin battery of Example 6.
Figure 12:
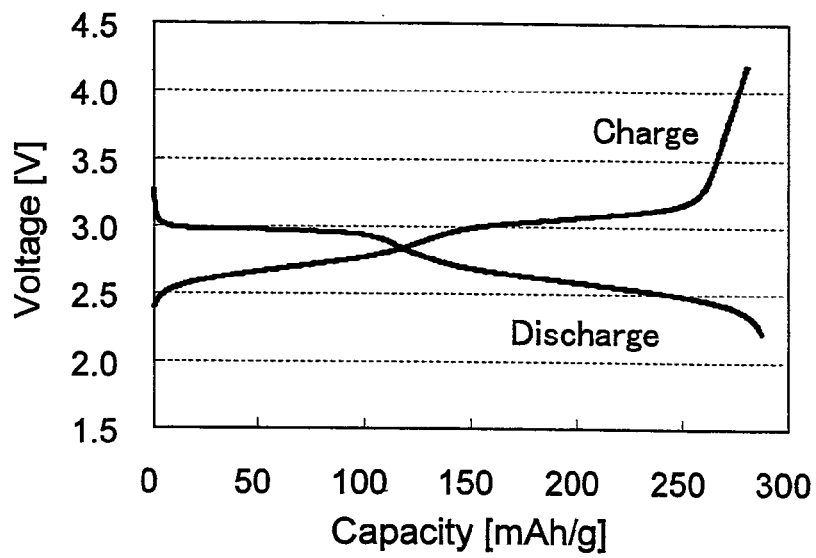
FIG. 12 is a charge/discharge curve of a coin battery of Example 9.
Figure 13:
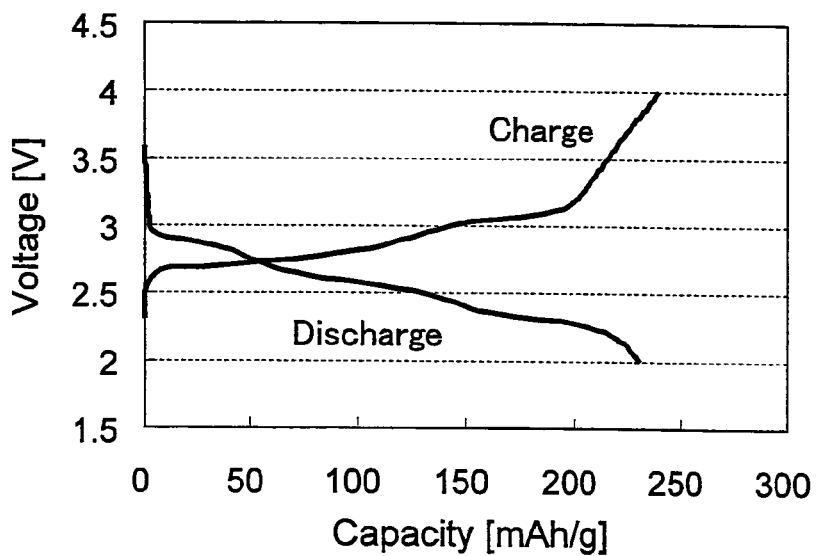
FIG. 13 is a charge/discharge curve of a coin battery of Example 10.
Figure 14:
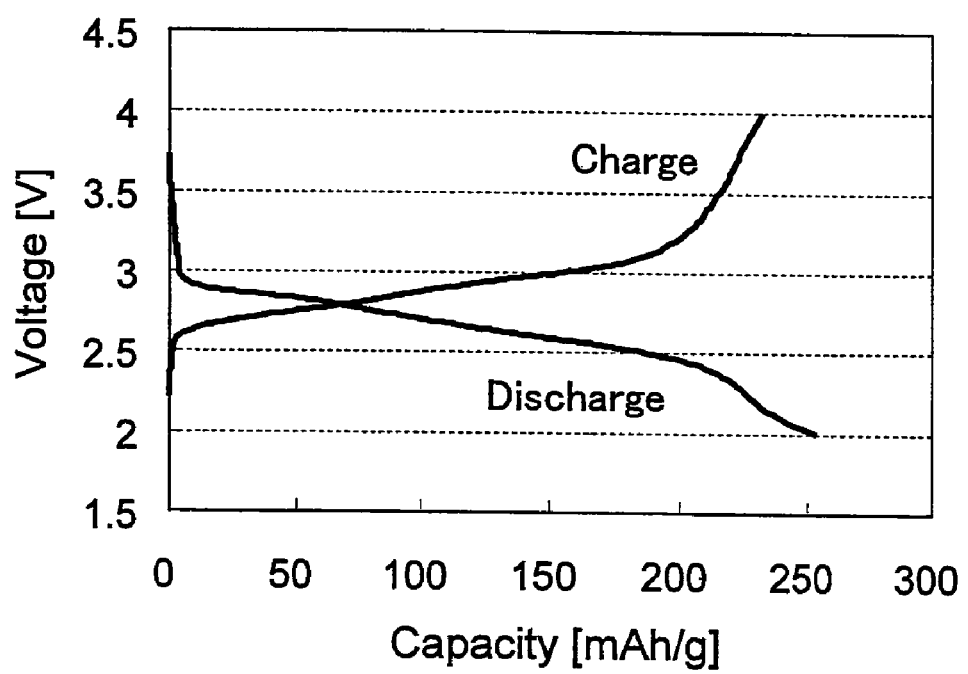
FIG. 14 is a charge/discharge curve of a coin battery of Example 12.

Also, FIG. 10 shows the charge/discharge curve of the coin battery of Example 4. FIG. 11 shows the charge/discharge curve of the coin battery of Example 6. FIG. 12 shows the charge/discharge curve of the coin battery of Example 9. FIG. 13 shows the charge/discharge curve of the coin battery of Example 10. FIG. 14 shows the charge/discharge curve of the coin battery of Example 12. FIGS. 10 to 14 confirm that these coin batteries reversibly charge and discharge in the potential range of 2.0 to 4.0 V.

(1) Synthesis of 3,4-bis(2,2-dimethoxy-1,3-dioxoindan-5-yl)thiophene Through Suzuki-Miyaura Coupling Reaction Between 2,2-dimethoxyindan-1,3-dione-5-boronic Acid Pinacol Ester and 3,4-dibromothiophene 2,2-dimethoxyindan-1,3-dione-5-boronic acid pinacol ester (24) (973 mg, 2.93 mmol), 3,4-dibromothiophene (35) (292 mg, 1.21 mmol), Pd(PPh₃)₄ (69 mg, 0.060 mmol), and sodium carbonate (766 mg, 7.22 mmol) were dissolved in a solvent mixture of 5 ml of toluene and 2.5 ml of ethanol, and the solution was mixed with 1 ml of water. After deaeration, the solution was heated at 85° C. in an argon atmosphere over night. The reaction liquid was cooled to room temperature, and water was poured into the reaction liquid, which was then extracted with chloroform. The extracted liquid of organic phase was dried with sodium sulfate and filtered to remove the drying agent. Thereafter, the solvent was removed at a reduced pressure. The crude product was purified in silica gel chromatography (hexane/ethyl acetate=5/2), to obtain 279 mg (47%) of 3,4-bis(2,2-dimethoxy-1,3-dioxoindan-5-yl)thiophene (36) in the form of a yellow solid. The readings for this compound are as follows.

¹HNMR (400 MHz, CDCl₃) δ; 3.67 (s, 12H), 7.52 (dd, J=8.0, 1.6 Hz, 2H), 7.58 (s, 2H), 7.86 (dd, J=8.0, 0.8 Hz, 2H), 7.92 (dd, J=1.6, 0.8 Hz, 2H).

TABLE 8

| Example | Positive electrode active material | | Theoretical capacity (mAh/g) | Charge/discharge capacity (mAh/g) | Utilization rate (%) | Mean discharge potential (V) |
|---|---|---|---|---|---|---|
| 4 | Triketone | 2a | 335 | 228 | 68 | 2.7 |
| 5 | compound | 2b | 255 | 184 | 72 | 2.7 |
| 6 |  | 2c | 221 | 210 | 95 | 2.7 |
| 7 | Multimer | 4b | 337 | 263 | 78 | 2.7 |
| 8 | Aromatic- | 5a | 272 | 231 | 85 | 2.7 |
| 9 | ring | 5b | 291 | 288 | 99 | 2.7 |
| 10 | containing | 5c | 228 | 182 | 80 | 2.7 |
| 11 | polyketone | 5d | 272 | 223 | 82 | 2.7 |
| 12 | compound | 5e | 268 | 254 | 95 | 2.7 |

As is clear from Table 8, the coin batteries (power storage devices) of Examples 4 to 12 using the triketone compounds as the active material exhibited high theoretical capacities, high discharge voltages, and high utilization rates. This confirms that the invention can provide a power storage device having a high energy density per weight.

In Table 8, all the coin batteries of Examples 4 to 12 exhibited a high average discharge potential of 2.7 V, and these batteries also exhibited high charge/discharge capacities of 182 to 288 mAh/g. This confirms that they are high capacity power storage devices.

The positive electrode active materials of Examples 5 to 12 are derivatives of the positive electrode active material of Example 4, and it has been confirmed that all the positive electrode active materials of Examples 5 to 12 are capable of high capacity charge/discharge. This indicates that in the triketone compound (2a), which is one of the basic skeletons of the electrode active materials of the invention, suitably changing a portion thereof other than the reaction skeleton to form a derivative results in a high performance electrode active material. Further, the positive electrode active materials of Examples 5 to 12 exhibited higher utilization rates than the positive electrode active material of Example 4. This indicates that in the triketone compound (2a), which is one of the basic skeletons of the electrode active materials of the invention, suitably changing a portion thereof other than the reaction skeleton to form a derivative results in an electrode active material of higher capacity.

The cause of the decrease in the utilization rate (the ratio of the charge/discharge capacity of a positive electrode active material to the theoretical capacity thereof) was diligently analyzed. The analysis confirmed that the positive electrode active material dissolved slightly in the electrolyte solvent. Also, the positive electrode active materials of Examples 5 to 12 exhibited higher utilization rates than the positive electrode active material of Example 4. These suggest that the positive electrode active materials of Examples 5 to 12 are electrode active materials with high safety and higher capacity in which the dissolution of the positive electrode active material into the electrolyte solvent is suppressed.

Specifically, as in Example 5 or 6, the introduction of a functional group such as a phenyl group or a thiophene group into a reaction skeleton is effective for suppressing the dissolution into electrolyte solvent, i.e., for increasing the utilization rate. Among these, the thiophene group is particularly effective.

Also, as in Examples 7 to 12, the introduction of a plurality of reaction skeletons into the molecule of a compound is effective for suppressing the dissolution into electrolyte solvent, i.e., for increasing the utilization rate. For connecting a plurality of reaction skeletons, the phenyl group or thiophene group as in Examples 8 to 12 is effective. Among them, the thiophene group is particularly effective.

Also, as in Example 9, a trimer in which three reaction skeletons are introduced into the molecule of a compound by using a phenyl group is particularly effective for suppressing the dissolution into electrolyte solvent, i.e., for increasing the utilization rate.

INDUSTRIAL APPLICABILITY

The electrode active material of the invention can be advantageously used in various power storage devices. Also, the power storage device of the invention can be advantageously used as the power source for various portable electronic appliances and transport devices, or uninterruptible power supplies, etc.

The invention claimed is:

1. A power storage device comprising a positive electrode, a negative electrode, and an electrolyte, wherein:
at least one of the positive electrode and the negative electrode includes an electrode active material comprising a ketone compound that includes a ring structure in a molecule, the ring structure being a five-membered or seven-membered ring composed of atoms at least three adjacent ones of which are each bonded to a ketone group,
the ketone compound is selected from the group consisting of a ketone compound having a structure represented by the following general formula (2) and a ketone compound having a structure represented by the following general formula (3):

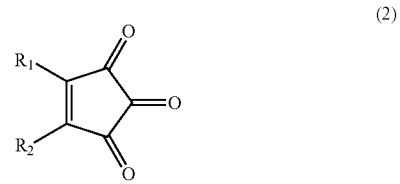

(2)

where $R_1$ and $R_2$ are each independently a hydrogen atom, a fluorine atom, or an unsaturated or saturated aliphatic group, the unsaturated or saturated aliphatic group may contain a halogen atom, a nitrogen atom, an oxygen atom, a sulfur atom, or a silicon atom, $R_1$ and $R_2$ may be bonded to each other to form a ring, the ring formed by the bonding of $R_1$ and $R_2$ may include a substituent selected from the group consisting of a fluorine atom, a cyano group, a C1 to C4 arkyl group, a C2 to C4 alkenyl group, a C3 to C6 cycloalkyl group, a C3 to C6 cycloalkenyl group, an aryl group, and an aralkyl group, and the substituent may contain at least one atom selected from the group consisting of a fluorine atom, a nitrogen atom, an oxygen atom, a sulfur atom, and a silicon atom, and

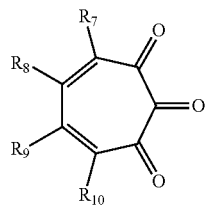
(3)

where $R_7$ to $R_{10}$ are each independently a hydrogen atom, a fluorine atom, a cyano group, a C1 to C4 arkyl group, a C2 to C4 alkenyl group, a C2 to C4 alkynyl group, a C3 to C6 cycloalkyl group, a C3 to C6 cycloalkenyl group, an aryl group, or an aralkyl group, and the respective groups represented by $R_7$ to $R_{10}$ may contain at least one atom selected from the group consisting of a fluorine atom, a nitrogen atom, an oxygen atom, a sulfur atom, and a silicon atom.

2. The power storage device in accordance with claim 1, wherein the positive electrode includes the electrode active material comprising a ketone compound as a positive electrode active material, the negative electrode includes a negative electrode active material capable of absorbing and desorbing lithium ions, and the electrolyte includes a salt comprising a lithium cation and an anion.

3. An electronic device including the power storage device of claim 1.

4. A transport device including the power storage device of claim 1.

5. The power storage device in accordance with claim 1, wherein the ketone compound has a structure represented by the following general formula (2A):

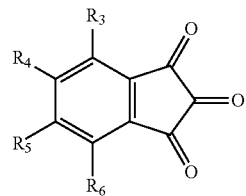
(2A)

where R3 to R6 are each independently a hydrogen atom, a fluorine atom, a cyano group, a C1 to C4 arkyl group, a C2 to C4 alkenyl group, a C2 to C4 alkynyl group, a C3 to C6 cycloalkyl group, a C3 to C6 cycloalkenyl group, an aryl group, or an aralkyl group, and the respective groups represented by R3 to R6 may contain at least one atom selected from the group consisting of a fluorine atom, a nitrogen atom, an oxygen atom, a sulfur atom, and a silicon atom.

6. The power storage device in accordance with claim 1, wherein the ketone compound has a plurality of structures represented by the general formula (2) or (3) in the molecule.

7. The power storage device in accordance with claim 6, wherein the ketone compound has a plurality of structures represented by the general formula (2) or (3) in the molecule, and the plurality of structures represented by the general formula (2) or (3) are bonded via an aromatic ring.

8. The power storage device in accordance with claim 7, wherein the aromatic ring derives from at least one aromatic compound selected from the group consisting of benzene, benzene derivatives, thiophene, naphthalene, naphthalene derivatives, anthracene, anthracene derivatives, pyridine, fluorene, and fluorene derivatives.

9. The power storage device in accordance with claim 1, wherein the ketone compound is a lithium salt in reduced form.

* * * * *